US012761882B1

(12) United States Patent
Dong

(10) Patent No.: US 12,761,882 B1
(45) Date of Patent: Oct. 13, 2026

(54) USER INTERFACE FOR A CODE GENERATION TOOL

(71) Applicant: AUGMENT COMPUTING, INC., Palo Alto, CA (US)

(72) Inventor: Xuanyi Dong, Mountain View, CA (US)

(73) Assignee: AUGMENT COMPUTING, INC., Palo Alto, CA (US)

( * ) Notice: Subject to any disclaimer, the term of this patent is extended or adjusted under 35 U.S.C. 154(b) by 241 days.

(21) Appl. No.: 18/544,013

(22) Filed: Dec. 18, 2023

Related U.S. Application Data

(60) Provisional application No. 63/587,251, filed on Oct. 2, 2023.

(51) Int. Cl.

| | |
|---|---|
| ***G06F 8/34*** | (2018.01) |
| ***G06F 8/33*** | (2018.01) |
| *G06F 9/451* | (2018.01) |
| *G06N 3/02* | (2006.01) |
| *G06N 3/0442* | (2023.01) |
| *G06Q 10/0631* | (2023.01) |

(52) U.S. Cl.
CPC .................. *G06F 8/34* (2013.01); *G06F 8/33* (2013.01); *G06F 9/454* (2018.02); *G06N 3/02* (2013.01); *G06N 3/0442* (2023.01); *G06Q 10/063112* (2013.01)

(58) Field of Classification Search
CPC .......... G06N 3/02; G06N 3/0442; G06F 8/33; G06F 9/454; G06F 8/311; G06F 8/34; G06F 16/951; G06Q 10/063112
See application file for complete search history.

(56) References Cited

U.S. PATENT DOCUMENTS

| | | | | |
|---|---|---|---|---|
| 11,074,048 | B1 * | 7/2021 | Wilson-Thomas | G06F 8/34 |
| 2012/0284294 | A1 * | 11/2012 | Nickell | G06F 16/951 707/E17.014 |
| 2017/0212829 | A1 * | 7/2017 | Bales | G06F 11/3604 |
| 2020/0097261 | A1 * | 3/2020 | Smith | G06F 8/33 |
| 2020/0159552 | A1 * | 5/2020 | Bodin | G06F 9/454 |
| 2024/0046169 | A1 * | 2/2024 | Myers | G06Q 10/063112 |
| 2024/0143288 | A1 * | 5/2024 | Kalra | G06F 8/33 |
| 2024/0281218 | A1 * | 8/2024 | Masad | G06F 8/33 |
| 2025/0085931 | A1 * | 3/2025 | Carrara | G06F 8/311 |
| 2025/0217114 | A1 * | 7/2025 | Roper, Jr. | G06N 3/02 |

OTHER PUBLICATIONS

Ren et al, CN109344230A (translation), Feb. 15, 2019 <CN_109344230A.pdf>.*

* cited by examiner

*Primary Examiner* — Tuan A Vu

(57) ABSTRACT

Methods, systems, products, services, and apparatuses for presenting domain-specific code suggestions for computer program code, comprising receiving a request to generate computer program code that is associated with a domain-specific code base; and presenting a code suggestion using a user interface, wherein the user interface is configured to manage one or more user interface inputs and outputs associated with the domain-specific code base.

20 Claims, 16 Drawing Sheets

USER INTERFACE FOR A CODE GENERATION TOOL

CROSS REFERENCE TO RELATED APPLICATION

This is non-provisional application for patent entitled to a filing date and claiming the benefit of earlier-filed U.S. Provisional Patent Application No. 63/587,251, filed Oct. 2, 2023, herein incorporated by reference in its entirety.

DETAILED DESCRIPTION

The present disclosure relates to methods, products, apparatuses, and services for presenting domain-specific code suggestions, that may be achieved at least in part using generative AI. Generative AI is a category of artificial intelligence that focuses on creating and generating new data, content, or information. Systems, software, and services that leverage generative AI (hereafter referred to as 'generative AI systems') may be able to produce outputs that resemble human-generated content, such as text, audio, and more, often enabled through the usage of deep learning techniques and neural networks. In one particular embodiment, generative AI systems may be able to produce computer program code (also referred to hereafter simply as 'code') in a variety of programming languages, as pseudocode, or in some other way.

Figure 1:
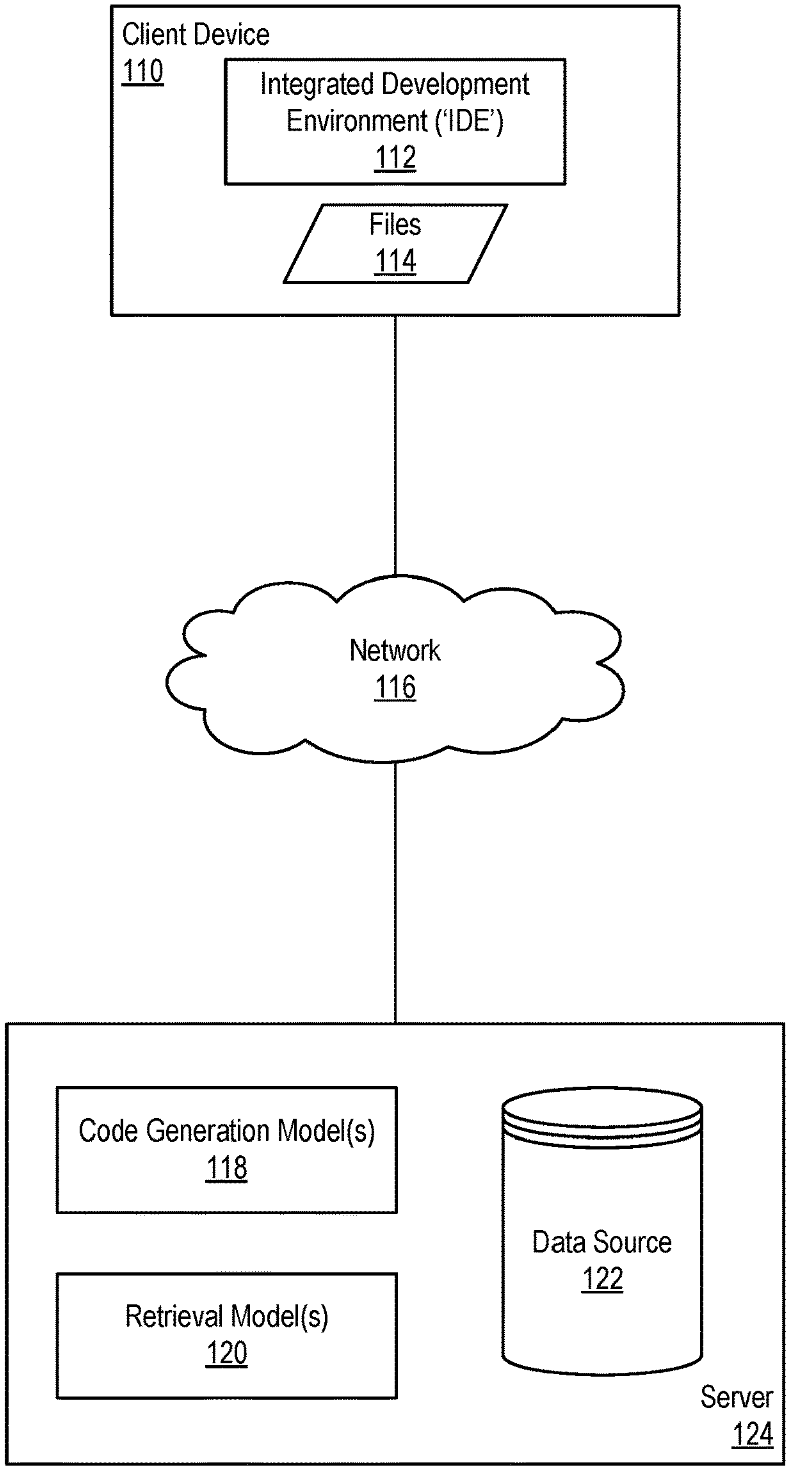
FIG. 1 a block diagram of an example system for enterprise specific code generation using generative artificial intelligence ('AI') in accordance with some embodiments of the present disclosure.

FIG. 1 is a block diagram of an example system in which one or more models are leveraged for enterprise specific code generation using generative AI. FIG. 1 includes a client device 110 and a server 124 that are connected via a network 116. The network 116 depicted in FIG. 1 may be embodied, for example, as a system (including a collection of networking devices, data communications links, and so on) that enables the exchange of digital information between multiple devices (e.g., endpoints), where in this embodiment those devices or endpoints include the client device 110 and the server 124. The network 116 may leverage physical or wireless medium to carry data between nodes using one or more data communications protocols. Such data communications protocols may include the rules and conventions that govern how data is formatted, transmitted, and received within the network 116. Such protocols can include, for example, TCP/IP, HTTP, SMTP, cellular protocols, and many others. Such a network 116 may be embodied as, for example, a Local Area Network ('LAN') that covers a small geographical area, a Wide Area Network ('WAN') that spans larger regions, a Virtual Private Network ('VPN') that uses encryption to create secure and private communication channels, the internet, or in some other way.

The client device 110 depicted in FIG. 1 may be embodied, for example, as a computer, smartphone, tablet, or other computing device that accesses and utilizes services provided by the server 124. The client device 110 will be described in greater detail herein, but the client device 110 may also include one or more applications or user interfaces that allows users of the client device 110 to interact with the server 124, one or more modules of software and hardware that enable the client device 110 to communicate with the server 124 by sending messages, packets, and the like to the server 124, various hardware components such as computer processors, memory, storage, networking interfaces, and much more. The client device 110 may also include one or more displays (e.g., a connected monitor, a touchscreen) and one or more user input devices (e.g., a keyboard, a mouse, a touchscreen) that enable users of the client device 110 to interact with the client device 110.

In the example depicted in FIG. 1, the client device 110 includes an integrated development environment ('IDE') 112. The IDE 112 may be embodied, for example, as a software application that provides an integrated set of tools and features to streamline the software development process. IDEs 112 may be used by developers to write, test, and debug code more efficiently, and may include features to support software development tasks such as coding, debugging, and project management. Examples of IDEs 112 that may be supported by the client device 110 can include, for example, Visual Studio, IntelliJ IDEA, Eclipse, NetBeans, PyCharm, and many others. The particular IDE 112 that is leveraged may depend on the programming language and platform being used.

In the example depicted in FIG. 1, the IDE 112 can include (amongst other modules and features) a code editor, which may be embodied as an interface that is used by a software developer to write, edit, and view source code. The editor may include features like syntax highlighting, code formatting to enhance code readability, and code completion features that may be augmented by interactions with the server 124 as described in greater detail herein.

In the example depicted in FIG. 1, the IDE 112 (or some other tool) may be used to access and/or manage one or more files 114. The one or more files 114 can include, for example, source code files that contain the instructions and logic for the software being developed (written in Java, Python, C++, or some other programming language), header files or other library files, configuration files which may specify settings and parameters for the application being developed, template files, script files, documentation files, configuration files for the IDE 112, and many others.

The server 124 depicted in FIG. 1 may be embodied, for example, as one or more computers (although in other embodiments the server 124 may be embodied as one or more hosted application(s)) that provides services, resources, or data to one or more client devices 110 over a network 116. The server 124 may include dedicated hardware systems designed to handle heavy workloads and ensure reliability, although in other embodiments the server 124 may be implemented through software on standard computers. Specialized server operating systems and software may even be used to optimize performance, security, or for some other purpose.

The server 124 depicted in FIG. 1 includes one or more code generation model(s) 118. The code generation model(s) 118 depicted in FIG. 1 may be embodied, for example, as one or more machine learning models designed to generate executable source code for various programming tasks. The code generation model(s) 118 may utilize natural language processing and machine learning techniques to understand and generate code in programming languages like Python, JavaScript, Java, C-based languages, and others. The code generation model(s) 118 may leverage deep learning architectures, such as recurrent neural networks (RNNs), transformers, or hybrid models that combine convolutional and recurrent layers.

In the examples depicted in FIG. 1, the code generation model(s) 118 may be configured to generate enterprise specific code. In other embodiments, the generated code may not be 'enterprise' specific but may be specific to some other group of users, some other entity that has associated computer code, or any other entity. In some embodiments, the code generation model(s) 118 generate enterprise (or entity) specific code, for example, in the sense that the code generation model(s) 118 are trained on code for a particular enterprise (e.g., a particular business organization, a particular business unit within a particular business organization) or entity, in the sense that code generation model(s) 118 leverage a knowledge base that is specific to some particular enterprise or entity (e.g., the enterprise's code base), or in some other way. As such, the code generation model(s) 118 depicted here may produce output that is tailored for a specific enterprise or entity as it adheres to their standards, leverages their code base, is written in their same style, and so on.

The code generation model(s) 118 depicted in FIG. 1 may be configured to consider the context in which the code is generated, as the code generation model(s) 118 can take into account any surrounding code or variables that may influence the code generation process. The code generation model(s) 118 may be used for code completion tasks where the code generation model(s) 118 are used to assist developers by providing code completion suggestions as the developer writes code. That is, the code generation model(s) 118 may (via the IDE 112) be provided with information describing where a user's cursor is positioned within a code editor, what code precedes the cursor, what code follows the cursor, and so on, as inputs to code completion process.

In the example depicted in FIG. 1, the server 124 can also include one or more retrieval model(s) 120. The retrieval model(s) 120 depicted in FIG. 1 may be embodied, for example, as machine learning models used for generating responses or recommendations based on retrieving and selecting relevant pre-existing content from a database or knowledge base (depicted herein as data source 122). The retrieval model(s) 120 may therefore leverage existing data or content to provide responses that are contextually appropriate and accurate. Such retrieval model(s) 120 may therefore rely on a database or knowledge base that contains a pre-existing data that serves as a source of information for generating responses. In FIG. 1, the retrieval model(s) 120 rely on information in the depicted data source 122, where the data source 122 can include, for example, a code repository associated with a particular enterprise or entity, documentation associated with the code base, and other information that is relevant to code that has been developed by the particular enterprise or entity.

In the example depicted in FIG. 1, the retrieval model(s) 120 may leverage various techniques such as, for example, feature extraction to identify meaningful features from content in the enterprise's code repository and code in the code editor of the IDE 112, similarity scoring or similar techniques to measure similarity between code in the code editor of the IDE 112 and the content in the data source 122, content ranking and selection, and so on. Such retrieval model(s) 120 may, in some embodiments, be combined with generative models (e.g., the code generation model(s) 120) to create hybrid models that leverages the strengths of both retrieval and generative models to produce more contextually relevant code completion recommendations.

In some embodiments, the retrieval model(s) 120 may be configured to generate precomputed latent representations of stored code (e.g., the code in a particular code base). The latent representation may be embodied, for example, as a floating-point value that captures relevant information about the stored code. Such features may not be directly observed or defined, but instead may be learned by the retrieval model(s) 120 from the raw input data (in this case the stored code). Such latent representations may be made available to the code generation model(s) 118 instead of (or in addition to) the textual representation of the stored code. In such a way, the latent representation may be further processed to encode additional context, deeper understanding, and interconnection with other memories. Furthermore, the systems described herein may refine the latent representations asynchronously and offline (i.e., separately from the process of the code generation model(s) 118 generating code).

In some embodiments, the retrieval model(s) 120 can be enhanced using static analysis of code. Such a process may, in some embodiments, involve statically analyzing existing code (i.e., code from a user's code base) to pick out some fill-in-the-middle ('FIM') examples. For example, the retrieval model(s) 120 may be trained with examples of what is typically written between a set of parentheses, examples of what is typically written inside a loop, examples of what is typically written to complete a function, and so on.

In some embodiments, the generative AI systems described here may leverage a set of static code analysis heuristics that work well and can be used to create a dataset that is useful for training models used by generative AI systems that can do FIM for computer program code. In these embodiments, models are trained, and training sets are generated to cover sampling at multiple levels of hierarchy (parenthesis, functions, class, etc . . . ). The training sets are also created with a distribution that is similar to a distribution that would be similar to a user's knowledge base (i.e., their code repository) so that models behave in accordance with the appropriate distribution.

Readers will appreciate that because each client device 110 has its own set of files 114, a software developer using a first client device may have a different set of files than a client software developer using a second client device. For example, the software developer using a first client device may update some function in a particular file, but without actually committing the updated file to a shared codebase (which may involve rounds of review or other version control procedures), the software developer using a second client device may not have access to the updated function in the particular file. As such, it is not abnormal for users of different client devices to have different versions of a shared codebase.

Readers will further appreciate that because each client device 110 can upload its local files to the server 124, the server 124 may generate different code completion recommendations for a user on a first client device 110 that has a first version of a particular file 114 than it would generate for a user on a second client device 110 that has a second version of a particular files 114, given that the different versions of the particular file 114 could result in different input tokens being sent to the code generation model(s) 118 and/or the retrieval model(s) 120. Readers will appreciate that although some files 114 may be distinct between a first client device and a second client device, some other files 114 may be identical (especially for two developers that are working on the same codebase). As such, and to avoid costly duplication, files (or portions thereof) may be deduplicated so that files (or portions thereof) that are common across multiple client devices 110 are only stored once by the server 124.

Figure 2:
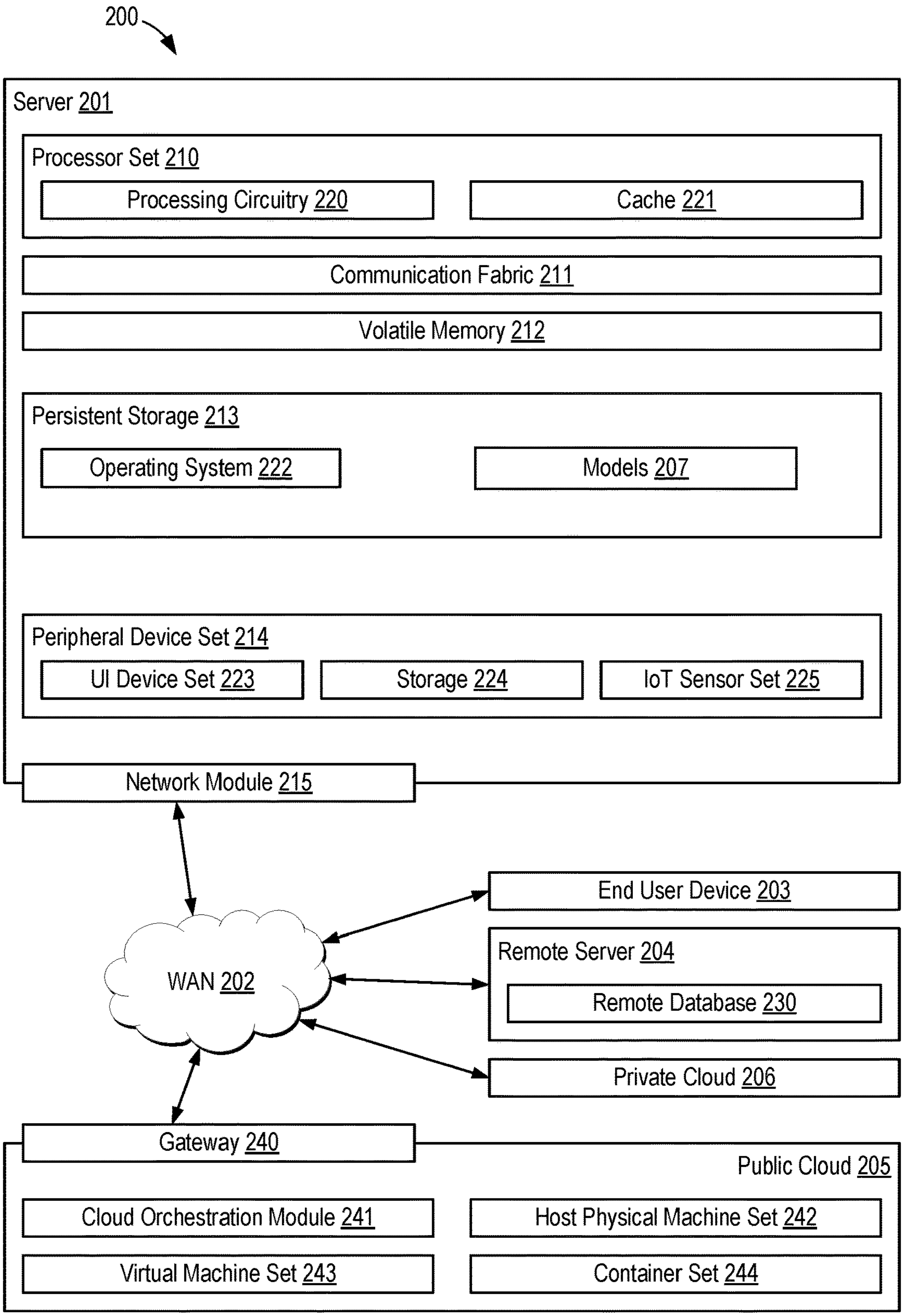
FIG. 2 sets forth a block diagram of an example computing environment configured for enterprise specific code generation using generative AI in accordance with some embodiments of the present disclosure.

For further explanation, FIG. 2 sets forth a block diagram of an example computing environment 200 configured for enterprise specific code generation using generative AI in accordance with some embodiments of the present disclosure. Computing environment 200 contains an example of an environment for the execution of at least some of the computer code involved in performing the inventive methods, such as various models 207 that may correspond to the models described in FIG. 1 and elsewhere in the present disclosure. In addition to models 207, computing environment 200 includes, for example, computer 201, wide area network ('WAN') 202, end user device ('EUD') 203 that may be similar to the client device of FIG. 1, remote server 204, public cloud 205, and private cloud 206. In this example embodiment, computer 201 includes processor set 210 (including processing circuitry 220 and cache 221), communication fabric 211, volatile memory 212, persistent storage 213 (including operating system 222 and models 207), peripheral device set 214 (including user interface ('UI') device set 223, storage 224, and Internet of Things ('IoT') sensor set 225), and network module 215. Remote server 204 includes remote database 230. Public cloud 205 includes gateway 240, cloud orchestration module 241, host physical machine set 242, virtual machine set 243, and container set 244.

Computer 201 may take the form of a desktop computer, laptop computer, tablet computer, smart phone, mainframe computer, quantum computer or any other form of computer or mobile device now known or to be developed in the future that is capable of running a program, accessing a network or querying a database, such as remote database 230. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible. Computer 201 may be located in a cloud, even though it is not shown in a cloud in FIG. 2. On the other hand, computer 201 is not required to be in a cloud except to any extent as may be affirmatively indicated.

Processor set 210 includes one, or more, computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in models 207 in persistent storage 213.

Communication fabric 211 is the signal conduction path that allows the various components of computer 201 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, volatile memory 212 is characterized by random access, but this is not required unless affirmatively indicated. In computer 201, the volatile memory 212 is located in a single package and is internal to computer 201, but, alternatively or additionally, the volatile memory may be distributed over multiple packages and/or located externally with respect to computer 201.

Persistent storage 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read only memory (ROM), but typically at least a portion of the persistent storage allows writing of data, deletion of data and re-writing of data. Some familiar forms of persistent storage include magnetic disks and solid-state storage devices. Operating system 222 may take several forms, such as various known proprietary operating systems or open-source Portable Operating System Interface-type operating systems that employ a kernel. The models 207 typically includes at least some of the computer code involved in performing the inventive methods.

Peripheral device set 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network ('SAN') that is shared by multiple, geographically distributed computers. IoT sensor set 225 is made up of sensors that can be used in Internet of Things applications. For example, one sensor may be a thermometer and another sensor may be a motion detector.

Network module 215 is the collection of computer software, hardware, and firmware that allows computer 201 to communicate with other computers through WAN 202. Network module 215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the inventive methods can typically be downloaded to computer 201 from an external computer or external storage device through a network adapter card or network interface included in network module 215. Network module 215 may be configured to communicate with other systems or devices.

WAN 202 is any wide area network (for example, the internet) capable of communicating computer data over non-local distances by any technology for communicating computer data, now known or to be developed in the future. In some embodiments, the WAN 202 may be replaced and/or supplemented by local area networks ('LANs') designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device ('EUD') 203 is any computer system that is used and controlled by an end user (for example, a customer of an enterprise that operates computer 201), and may take any of the forms discussed above in connection with computer 201. In some embodiments, the EUD 203 may perform all of the functions of the client device of FIG. 1 and may include the IDE and other components described with reference to FIG. 1 and elsewhere in the present disclosure. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

Remote server 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

Public cloud 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments ('VCEs') typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202.

Some further explanation of virtualized computing environments ('VCEs') will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 206 is similar to public cloud 205, except that the computing resources are only available for use by a single enterprise. While private cloud 206 is depicted as being in communication with WAN 202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

Figure 3:
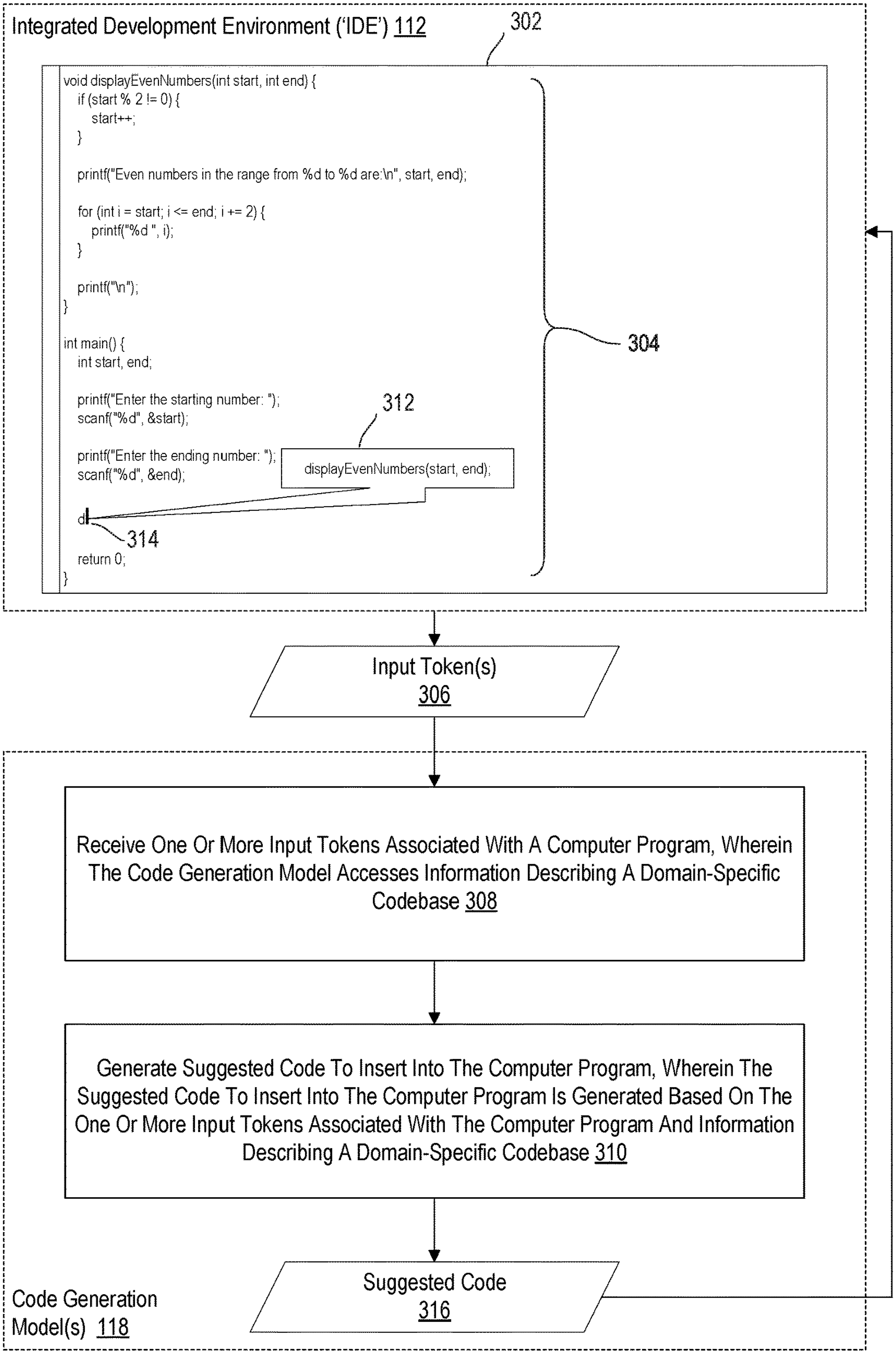
FIG. 3 sets forth a flow chart illustrating an example method of enterprise specific code generation using generative AI in accordance with some embodiments of the present disclosure.

For further explanation, FIG. 3 sets forth a flow chart illustrating an example method of enterprise specific code generation using generative AI in accordance with some embodiments of the present disclosure. The example method depicted in FIG. 3 includes one or more code generation model(s) 118 and an IDE 112 as described elsewhere in the present disclosure.

In the example depicted in FIG. 3, the IDE 112 includes a code editor 302, where a computer program 304 that displays even numbers between two input parameters. In this example, the computer program 304 is intended to be depicted as being in draft, with a software developer drafting code that is included in the computer program 304. More specifically, the software developer's cursor 314 is depicted near the bottom of the computer program 304, as the developer is writing a line of code that begins with the letter "d" followed by the cursor 314. In this example, the code editor 302 is depicted as displaying a recommended code completion 312 that is generated as will be described in greater detail below. The recommended code completion 312 includes a function call to the displayEventNumbers function that is defined in the code editor 302. Readers will appreciate that this example is purposefully intended to be quite simple for ease of explanation, but in other embodiments the recommended code completion 312 may be far more complex, may be presented in other ways, and so on. In fact, although this embodiment illustrates an example in which recommended code completions 312 are presented to a software developer via an IDE 112, in other embodiments the systems, methods, products, modules, or components described herein may be used to automatically generate entire software applications, functions, and so on.

The example method depicted in FIG. 3 includes receiving 308, by a code generation model 118, one or more input tokens 306 associated with a computer program 304. The one or more input tokens 306 may be discrete units of information (e.g., text, some representation of text such as a hash of the text) that are used to as input to the code generation model(s) 118. For example, a first token may include some representation of the text that precedes the location of the cursor 314 in the computer program 304, a second token may include some representation of text that follows the location of the cursor 314, and so on. In fact, many tokens may be generated that represent different portions of the text that precedes the location of the cursor 314, different portions of the text that follows the location of the cursor 314, representations of portions of documentation associated with the computer program 304, representations of libraries that are utilized by the computer program 304, representations infrastructure-as-code ('IaC') templates for the environment that executes the computer program 304, and so on. In such a way, the tokens can essentially represent the state of the computer program 304 that is being developed.

Readers will appreciate that the input tokens 306 can essentially guide the behavior of the code generation model(s) 118 and can be important inputs that drive the output of the code generation model(s) 118. Each input token 306 may be part of a sequence of input tokens 306*s* that collectively form the input to the code generation model(s) 118. Readers will appreciate that input tokens 306 can be of differing types that may determine how the code generation model(s) 118 interprets and processes each particular input token 306. Readers will further appreciate that the position of each input token 306 in the input sequence signifies the order or context in which the input token 306 appears, as the preceding and following input tokens 306 in the input sequence provides context for a particular input token 306. In such a way, the context helps the code generation model(s) 118 understand the relationships and dependencies between various input tokens 306, thereby helping the code generation model(s) 118 generate accurate and contextually relevant suggested code 316 that can ultimately be presented as a recommended code completion 312 or leveraged in some other way. The input tokens 306 may be generated by the IDE 112 or some other module performing a variety of steps, including preprocessing steps to clean and structure the code data. This process may involve performing tokenization steps, separating code into individual tokens (e.g., keywords, operators, identifiers), removing irrelevant or sensitive information, and performing other preprocessing steps to generate the input tokens 306.

In the example method depicted in FIG. 3, the one or more input tokens 306 associated with the computer program 304 may be generated by the IDE 112, by a plug-in or extension for the IDE 112, by some other module that is accessible by the IDE 112, or by some other intervening module between the IDE 112 and the code generation model(s) 118. The one or more input tokens 306 associated with the computer program 304 may be received 308 by the code generation model(s) 118, for example, via one or more messages that are received by the code generation model(s) 118, via one or more queues or other data structure that the IDE 112 inserts input tokens 306 into and that the code generation model(s) 118 retrieves input tokens 306 from, via the IDE 112 directly writing (e.g., via an RDMA or RDMA-like operation) the input tokens 306 into memory on server (124 in FIG. 1) that supports the execution of the code generation model(s) 118, or in some other way.

In the example method depicted in FIG. 3, the code generation model 118 may access information describing a domain-specific codebase. The domain-specific codebase may be embodied, for example, as the codebase for a particular business enterprise, as the codebase for a particular business unit within a business enterprise, as the codebase for some collection of software developers, as the codebase for some other entity, and so on. The information describing a domain-specific codebase can also include non-code information such as, for example, documentation associated with a code base, commit histories for code in the code base, information describing an environment some software in the code base will be executed, information describing support tickets for code in the code base, information describing bugs in the code base and their resolution, information describing whether some code was generated by a human developer or generative AI, information identifying which particular software developer wrote some code in the code base, performance information gathered during execution of some code in the code base, environmental information (e.g., schemas in a data warehouse that contains data to be used by the code, cloud infrastructure layout, Remote Procedure Call ('RPC') endpoint configurations) describing the environment that code will be executed in, infrastructure information (e.g., information about a Kubernetes pods that may be running, information about the cloud infrastructure) describing the environment that code will be executed in, and so on. The information describing a domain-specific codebase may be embodied, for example, as the data source (122 of FIG. 1) depicted in FIG. 1. Such information may be inserted into the generated code, used to drive some query, or otherwise used by one or more of the models.

In some embodiments, the code generation model(s) 118 may access information describing a domain-specific codebase, for example, by receiving information from a knowledge base that includes code in the domain-specific codebase. Such information may be received from a trained retrieval model (such as the trained retrieval model(s) 120 depicted in FIG. 1). In some embodiments, the retrieval model(s) may be distinct from the code generation model(s) 118, the retrieval model(s) may be trained on a different training set than the code generation model(s) 118, and so on. In some embodiments, multiple retrieval models may be trained to do the retrieval. These retrieval models may be used, for example, to look at a piece of code (i.e., code that is being written by a developer), compare it to some other code/search the knowledge base for the most relevant piece of code, and then present that relevant piece of code to the developer or to another model. To train these retrieval models, the models may need to be provided with many examples of code that is related so as to enable the model to identify related code. To generate a signal that relates two pieces of code, some embodiments may examine existing code repositories and look at each change that is made in the code repository and identify situations in which changing a first piece of code was followed by a second piece of code being changed, as this may be indicative of the first piece of code and the second piece of code being related. This may be especially true in some situations such as, for example, when the same user changed each piece of code in a relatively short period of time. In these embodiments, commit histories from a code management system may be examined to identify the activity described above, or other data sources may be examined to identify activity that may be taken as a signal that some pieces of code are related. In other embodiments, other information may be indicative that some pieces of code are related. For example, if two pieces of code are described in the same document (e.g., a design document), this may be an indication that the two pieces of code are related. Readers will appreciate that such signals (and other signals) may be fairly specific to code rather than language generally, so these signals may be more useful when training retrieval models that are part of a generative AI system that generates computer program code.

In some embodiments, the code generation model(s) 118 may access information describing a domain-specific codebase by retrieving, from a database that includes memories generated by examining the domain-specific codebase, one or more memories. In some embodiments one or more models are trained to store a memory corresponding to each of a plurality of tokens in a database. In such embodiments, models trained to store memories are trained from a corpus of words obtained from a specific enterprise (e.g., a domain or an entity), allowing the memories to reflect contextual information about usage of tokens in the specific enterprise. By using enterprise-specific information to generate memories for tokens, the model is able to account for a specific implementation environment and leverage preferences or criteria specific to the specific domain. For example, a code generation model 118 may be configured to leverage memories when generating suggested code 316 to insert into the computer program 304, where the memories account for coding preferences or specific libraries particular to an enterprise, such as an entity or an organization. This allows different enterprises to use a code constructs, functions, words, or other elements in a computer program in different ways or in different contexts, with the memories generated by the trained model accounting for the enterprise specific usage. In such a way, memories allow the code generation model(s) 118 to provide suggested code 316 that are tailored to the enterprise.

The example method depicted in FIG. 3 also includes generating 310, by the code generation model(s) 118, suggested code 316 to insert into the computer program 304. In the example method depicted in FIG. 3, the suggested code 316 to insert into the computer program 304 is generated based on the one or more input tokens 306 associated with the computer program 304 and information describing a domain-specific codebase.

The code generation model(s) 118 may generate 310 suggested code 316 to insert into the computer program 304, for example, by receiving an initial code snippet (or even a natural language description of a code) in the form of input tokens 306 and predicting the next token in the sequence (or intervening token when the input tokens 306 include tokens before and after a cursor or other reference point). In such an example, the code generation model(s) 118 may generate 310 suggested code 316 in the form of tokens that are generated one by one, taking into account the context provided by the preceding tokens. The code generation model(s) 118 may maintain an internal state that keeps track of the context of the code it is generating, where the context can include variables, function declarations, loops, conditionals, and other elements that are used to generate code that follows a logical and semantically correct structure. The code generation model(s) 118 may therefore be designed to understand and replicate the structure, syntax, and semantics of programming languages and computer programs that the code generation model(s) 118 can access, including those computer programs that are part of the domain-specific codebase. Readers will appreciate that the code generation model(s) 118 may generate code up to a specified length, until a specific stop token is reached, or in some other way.

Figure 4:
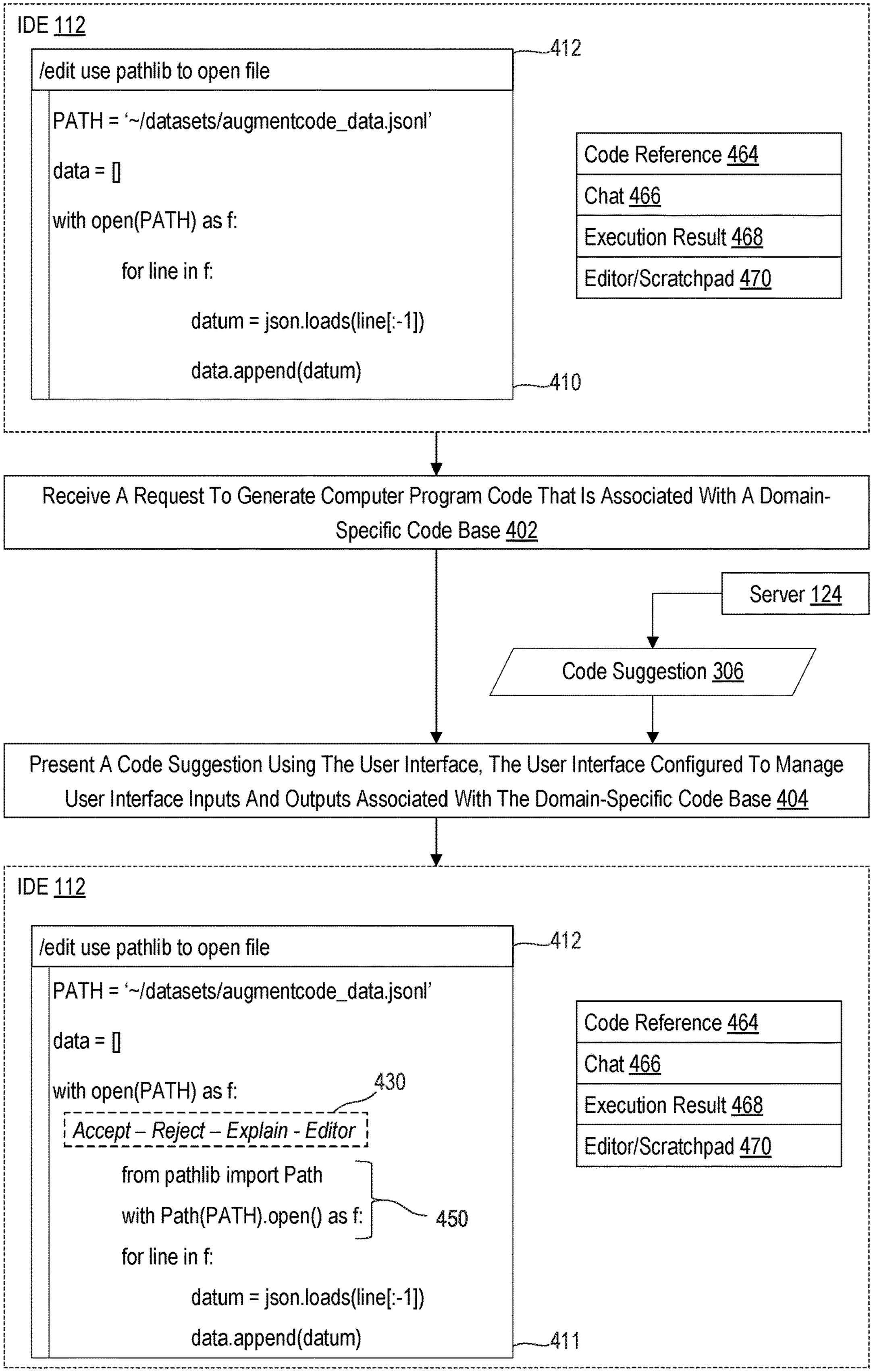
FIG. 4 sets forth a flow chart illustrating an example method of presenting domain-specific code suggestions in accordance with some embodiments of the present disclosure.

For further explanation, FIG. 4 sets forth a flow chart illustrating an example method of presenting domain-specific code suggestions in accordance with some embodiments of the present disclosure. The example method depicted in FIG. 4 can be carried out by, for example, integrated development environment (IDE) 112, an extension to IDE 112, or by some other component of client device 110. As shown in FIG. 1, IDE 112 may be a component of client device 110. The presentation of client device 110 is omitted from FIG. 4 for ease of illustration. However, readers will appreciate that IDE 112 can operate as a front-end user interface such that a user can use IDE 112 to interact with one or more code generation functionalities that are described above with respect to FIGS. 1-3.

The example method depicted in FIG. 4 includes receiving 402 a request to generate computer program code that is associated with a domain-specific code base. Receiving 402 a request to generate computer program code that is associated with a domain-specific code base can be carried out using a variety of components, such as an API, a messaging layer, a protocol, a networking component, or the like. In one embodiment, receiving 402 the request to generate computer program code that is associated with a domain-specific code base can be carried out via a user interface, such as a graphical user interface (GUI) or any other user-facing tool or component that can receive user inputs involving such requests. As described above with respect to FIGS. 1-3, a domain-specific code base can be a code base that includes code for a particular enterprise such as a particular business organization or business unit in the sense that code generation model(s) 118 leverage a knowledge base that is specific to some particular enterprise or entity (e.g., the enterprise's code base). Accordingly, the request may involve a user wishing to see a code completion that is relevant to that domain-specific code base.

The user interface can be used to provide user inputs. These user inputs can take the form of keyboard inputs (keystrokes, key combinations such as keyboard shortcuts), mouse inputs (click, double-click, drag, highlight, scroll, etc.), touch inputs (tap, double-tap, pinch to zoom, drag, etc.), audio or video inputs (voice or gesture inputs and the like), or inputs via any user interface configured to receive requests to generate computer program code. In some embodiments, one or more keystrokes of a user can be interpreted as a request to generate computer program code. For example, a user may be authoring code in window 410. One or more of the user's keystrokes can be used as an input that causes generation of a code suggestion request or code completion request that is, for example, sent to server 124 for obtaining a code completion. The request may be tailored based on the user's entered keystrokes, characters or words adjacent to where the user is entering text (e.g., a prefix or suffix) or based on other contextual information (e.g., open tabs, user identifiers, commit history, and so on).

While the above embodiment indicates that a user's entered keystrokes represent an implicit trigger to initiate generation of computer program code, in other embodiments, the user may enter an explicit request for computer program code. The example method depicted in FIG. 4 shows input box 412 of IDE 112. Input box 412 can be, for example, a text input box that can be used to enter a request to generate computer program code. Window 410 shows a portion of existing code that was previously authored or loaded by a user prior to a request to generate computer program code.

Receiving the request can include receiving an input to edit code, add code, delete code, search code, accept a code completion, reject a code completion, request an explanation of code completion, highlight a piece of code and get outputs such as explanations or code suggestions, and so on. Moreover, acceptance, rejection, explanation, or a request to edit code can also be initiated via, for example, keyboard shortcuts. In some embodiments, the request can be received through a feature of IDE 112. In other words, receiving the request can include accessing the disclosed user interface features via an IDE feature such as, for example, Visual Studio Code CodeLens, Visual Studio Intellisense, or the like.

Window 410 shows computer program code involving a path variable and code to load or append one or more lines of a file at the listed path. While the code is presented as shown in window 410, a user may enter a request to generate computer program code using input box 412. For example, as shown in FIG. 4, a user may type in "/edit use pathlib to open file". In this text string, the term "/edit" may be a special term used to initiate a specific command, such as to generate computer program code. In other examples, other special terms may be used, such as "/explain" before a request to provide an explanation of computer program code, as well as other terms. In other examples, no special term may be used and client device 110 or IDE 112 may be configured to determine the nature of the request without the need for a user to use specific terms.

While the above examples show that the request to generate computer program code is received via input box 412, the request can be received in several other ways. For example, the request can be received via another code editing window, a chat window, a side panel or console, or the like. The request can be received without an explicit user input, such as where the IDE 112 is configured to analyze computer program code being entered by a user in window 410 and automatically generate a request for a code completion. For instance, IDE 112 also includes code reference window 464, chat window 466, execution result 468, and scratchpad window 470. Readers will appreciate that, in some embodiments, one or more of the abovementioned components may not always be displayed in IDE 112. For example, one or more of input box 412, code reference window 464, chat window 466, execution result 468, or scratchpad window 470 may be presented at all times, presented only at certain times, or not presented unless in use. Moreover, requests to generate computer program code can be received through any of the abovementioned components. Different code generation requests can be in progress through different ones of the abovementioned components at the same time.

The example method depicted in FIG. 4 also includes presenting 404 a code suggestion using a user interface, wherein the user interface is configured to manage one or more user interface inputs and outputs associated with the domain-specific code base. Presenting 404 a code suggestion using a user interface can include presenting a code completion that is generated using a code generation model (e.g., code generation model(s) 118) that is trained using a domain-specific code base.

Presenting 404 the code suggestion can be carried out in several ways. In one embodiment, there may be a code portion that is currently being viewed or edited as shown in window 410. Then the request to generate the code suggestion may be executed. As a result, the code suggestion can be presented using an updated version of window 410, shown as window 411. As shown in FIG. 4, window 410 includes computer program code involving a path variable and code to load or append lines of a file. When the request is received to "use pathlib to open file", the code suggestion 450 is presented as shown in window 411. Code suggestion 450 can be the result of, for example, a code generation model trained on a domain-specific code base receiving the request entered in input box 412 and generating lines of computer program code in response that are then presented in window 411. For example, code suggestion 450 recites:

```
from pathlib import Path
with Path (PATH).open( ) as f:
```

In some implementations, code suggestion 450 can be automatically inserted into the appropriate position within the code shown in window 411. In other implementations, the code suggestion may be presented in a separate window. In either of the above implementations, IDE 112 can present action prompt 430. Action prompt 430 can prompt a user to accept or reject code suggestion 450. Action prompt 430 can also include other menu options, such as an option to explain code suggestion 450. Action prompt 430 can also include a menu option for a user to start another edit window, where the other edit window can include code suggestion 450 and/or additional code from window 410 in case a user wishes to separately edit a code portion that includes code suggestion 450. As an example, a selection of "Editor" from action prompt 430 can cause IDE 112 to present the code in window 411 in another window such as scratchpad window 470, for separate code editing.

While the above example shows that code suggestion 450 is inserted into window 410 (with the result shown as window 411 in FIG. 4) presenting 404 the code suggestion can be carried out in several other ways. For example, referring back to the example involving a separate editing window, IDE 112 may be configured to present code suggestion 450 in a separate code editing window (such as scratchpad window 470) without prompting the user or requiring additional instruction from the user. Similarly, code suggestion 450 can be presented via some other UI element of IDE 112, such as another window, popup box, or side panel. Moreover, these UI elements can be reconfigured or repositioned in different positions around IDE 112.

Presenting 404 the code suggestion can include presenting the code suggestion as part of an explanation. For example, a user may request an explanation of existing code, such as code in window 411. In response, IDE 112 can present an explanation of some code portion of the code in window 411, and this explanation can include a narrative explanation that describes functions of different code portions as well as generated computer program code that assists in the explanation or is presented as an example or a code suggestion. For example, code suggestion 450 can be included in the generated explanation.

Presenting 404 the code suggestion can include presenting a code suggestion as part of one or more code references, such as can be presented via code reference window 464. In some embodiments, code reference window 464 can be used to provide code file names, code portions, code comments, documentation, or any other related information that is relevant to code being edited using window 410. Readers will appreciate that information provided via code reference window 464 can be derived from or generated using a domain-specific code base. As an example, code suggestion 450 can be presented as part of one or more code references via code reference window 464. In this example, code suggestion 450 may be an instance of similar code that exists in the domain-specific code base. For example, in some other code file, the code may include the lines of code suggestion 450 as an instance where a user used the pathlib module to open a file or get its contents. Accordingly, in response to the request to "use pathlib to open file", code reference window 464 can show code suggestion 450, possibly along with a reference to other files containing the code suggestion, or other relevant documentation.

Presenting 404 the code suggestion can include presenting the code suggestion in a chat window such as chat window 466. IDE 112 may be configured to provide the ability for a user to chat with a code generation tool, such as one backed by code generation model(s) 118. Readers will appreciate that IDE 112 can present chat functionality enabling a user to enter questions or other inputs as chat messages and receive responses as chat messages. The responses can include answers to questions or to requests such as requests for code suggestions. Accordingly, presenting 404 the code suggestion can include presenting, for example, code suggestion 450 in chat window 466, such as in response to a request for a code suggestion that is entered in chat window 466 by a user as a chat message.

Presenting 404 the code suggestion can include presenting a plurality of code suggestions. In some implementations, in response to a request, IDE 112 can present multiple code suggestions in various ways. For example, two or more code suggestions can be presented as a list of code suggestions from which user can copy code, as a list of suggestions from which a user can make a selection, or as another type of list view. Multiple code suggestions can be presented as a carousel of options or a similar presentation structure or presentation mode, where a user can toggle through code suggestion options one at a time and select a preferred option. When code suggestion options are presented one at a time, a user can be permitted to toggle between the options, or the user can also be prompted to (or at least encouraged to) affirmatively accept or reject an option. By encouraging the user to make definite choices regarding option preferences, IDE 112 can capture user preferences regarding these options. This user preference information can be, in some cases, provided as an input to code generation model(s) 118 in order for code generation model(s) 118 to provide improved code suggestions based on the user preferences. The user preferences captured from the user's selections on the multiple code suggestions can be used to refine a next option presented to the user. For example, if a user rejects a first one of the multiple code suggestions, then the next code suggestion that is presented in the set can be updated based on the user's rejection of the first suggestion.

Presenting 404 a code suggestion can include presenting single-line or multi-line code suggestions. As with other code suggestion features outlined above, this can be a configurable setting whereby a user can specify whether the user wishes to receive code suggestions line by line or whether multiple lines at a time are acceptable.

Readers will appreciate that where a plurality of the code suggestions is generated, some code suggestions may be generated faster than others. For example, some code suggestions may be shorter in length or otherwise require less processing to be generated. Accordingly, presenting 404 a code suggestion can include presenting the faster-generated code suggestions first or before other code suggestions that are generated more slowly. In one embodiment, code suggestion presentation may be initiated as soon as the first-generated code suggestion is available, even as processing continues for generating other code suggestions. Moreover, the first-generated (or fastest generated) code suggestion can be presented in different ways, such as by being incorporated into code the user is editing, even as other code suggestions are presented in another UI element, such as in side panel.

Additionally, presenting code suggestions as they are generated or in the order that they are generated can be a configurable setting. Readers will appreciate that speed may be a key concern for a user, such that the user may configure IDE 112 to present code suggestions in the order that they are generated. In some scenarios, the code suggestions that are generated later than the first one or the fastest one may even be superior in some way. For example, the later-generated code suggestions may include more optimized code, or result in faster code execution, or may have other merits. However, particularly where a user desires the fastest possible code suggestion, IDE 112 may be configured to present code suggestions as fast as they are generated without presenting them with respect to some other quality factor, such as code execution and so on. Finally, the user's behavior in selecting (or configuring the system for) the fastest code suggestion can also be recorded via IDE 112 and used as an input for code generation. For example, IDE 112 can determine that the user wished for fast code suggestions just to get to a running program as soon as possible, and that later the user optimized the code by hand. In such cases, IDE 112 can learn that the user wanted fast code suggestions and later hand-coded one or more optimizations to the code, and this can lead to changes to code suggestion behavior. For example, for a next request for code suggestions, fewer code suggestions may be generated, given that this user is likely to accept the first code suggestion provided and is less likely to select a later-provided code suggestion.

Figure 5:
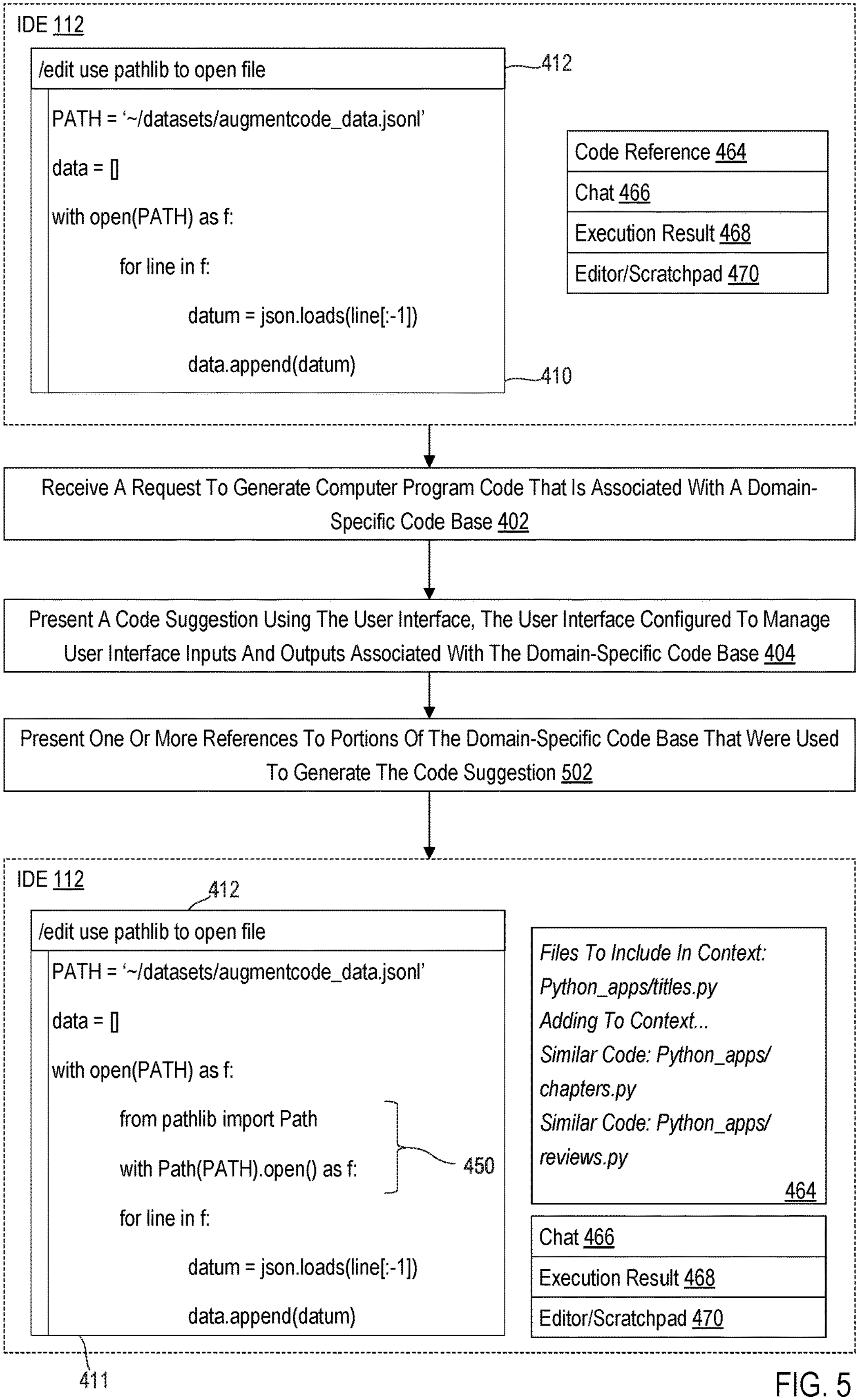
FIG. 5 sets forth a flow chart illustrating an additional example method of presenting domain-specific code suggestions in accordance with some embodiments of the present disclosure.

FIG. 5 sets forth a flow chart illustrating an additional example method of presenting domain-specific code suggestions in accordance with some embodiments of the present disclosure. The example method depicted in FIG. 5 is similar to the example method depicted in FIG. 4 as it includes some of the same steps.

The example method depicted in FIG. 5 also includes presenting 502 one or more references to portions of the domain-specific code base that were used to generate the code suggestion. Presenting references to portions of the domain-specific code base can be carried out in various ways. In some embodiments, the code references can be presented in a side panel or a separate window such as code reference window 464 as shown in FIG. 5. For example, when a code suggestion is presented, such as by incorporating the code suggestion in working code in window 411, code references can be presented in a side panel that describes code files of the domain-specific code base that were used as references or inputs in generating that code suggestion. The code files shown as code references can also include similar code files to the one the user is editing. The presented code files may be selectable, enabling a user to jump to the code file that is presented as a reference. Code references can also be presented in other ways, such as in a speech bubble or a tooltip element of the UI. For example, a user can mouse over or hover over a code suggestion and see code references that are relevant to the code suggestion, such as code files of the domain-specific code base that were used to generate the code suggestion or that were similar code files. While the above examples are described with respect to code suggestions, readers will appreciate that any of the code reference functionality described herein can also apply to existing code in window 410 or window 411. For example, a user may highlight or select a line of code such as "datum=json.loads (line [:−1])" which may be a line of code that was authored by the user and not part of code suggestion 450. In response, IDE 112 can present code references for that selected line, such as similar code files that include that line of code, or other references or documentation that illustrate the usage of similar code in other locations in the domain-specific code base.

Presenting references to portions of the domain-specific code base can also include presenting examples of coding best practices that were used to generate a code suggestion. For example, in addition to or as an alternative to references from the domain-specific code base, there may be coding examples or other code portions that were, for example, previously authored by another developer (such as someone with more experience with the code base, or someone that is a senior developer in the organization). These examples can be presented as code references in order for the user to learn more about coding best practices that are specific to the enterprise and enable the user to understand the rationale behind particular code suggestions that are being generated for the user.

Presenting references to portions of the domain-specific code base can also include presenting other aspects of the domain-specific code base. For example, IDE 112 can present a commit history associated with portions of the domain-specific code base, such as the portion the user is editing. For example, the user may be editing code that is also being worked on by another user. Accordingly, in response to a request for a code suggestion, or otherwise, references such as commit history may be generated and presented on IDE 112 in order to inform the user or provide background to the user regarding currently provided code suggestions. The references can also include other documentation such as readme files, configuration files, metadata such as identifiers for other developers that worked on this code, repository directory details or other repository metadata, and so on.

Presenting references to portions of the domain-specific code base can also include presenting a record of user commands or requests that were made with respect to code that is currently being edited. For example, the references can include a current log of user commands or requests for code suggestions or any other inputs showing the user's current coding journey with respect to the file being edited. Relatedly, a coding journey for another user that worked on this file can also be shown, showing a history of another user's commands or inputs such as requests for code suggestions and the resulting code suggestion that was provided to the other user. Presenting references to portions of the domain-specific code base can also include presenting details of the process of retrieval from the code base and generation of a code completion or any other relevant steps that are being performed by, for example, retrieval models and code generation models of server 124.

Figure 6:
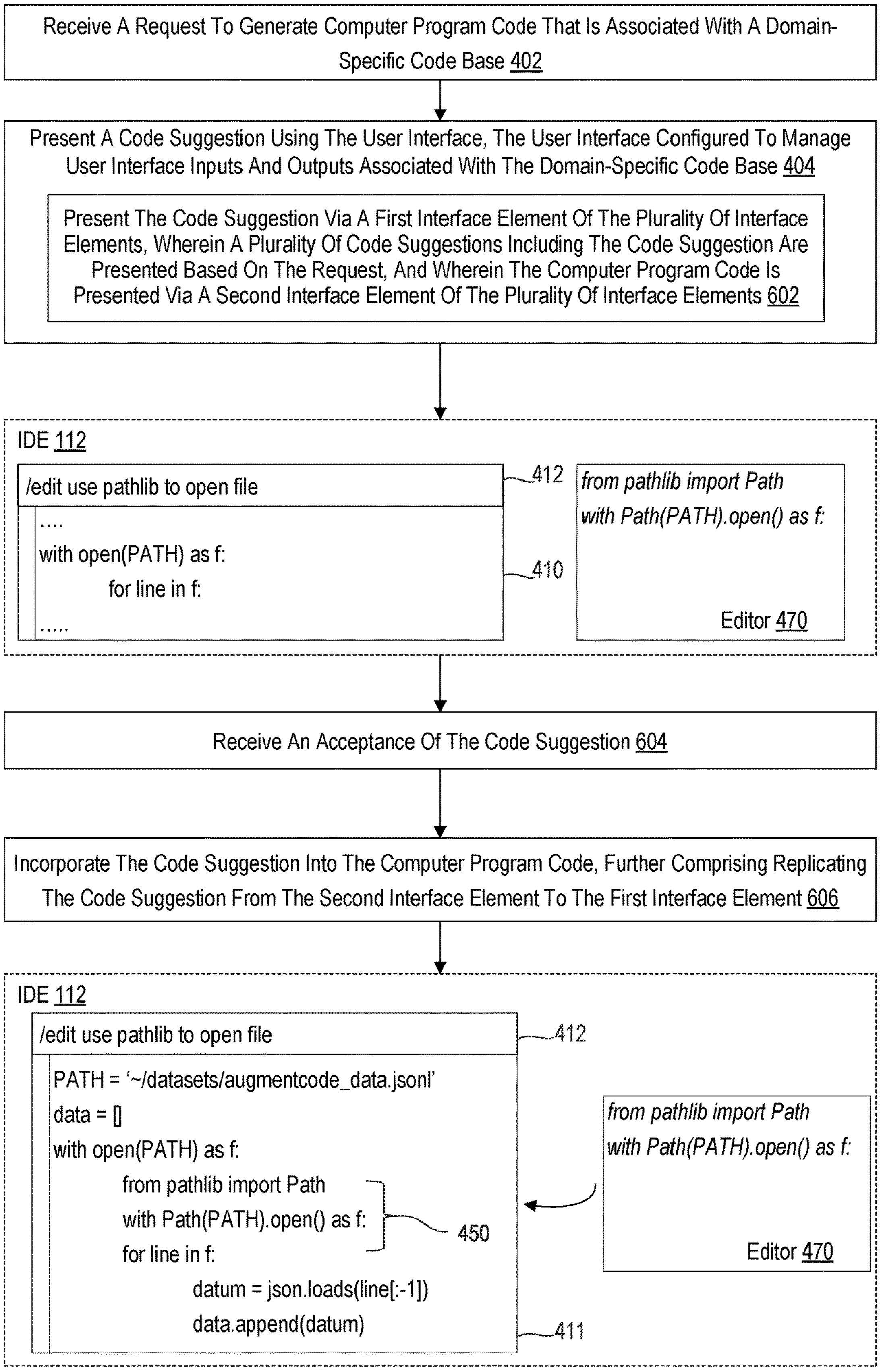
FIG. 6 sets forth a flow chart illustrating an additional example method of presenting domain-specific code suggestions in accordance with some embodiments of the present disclosure.

FIG. 6 sets forth a flow chart illustrating an additional example method of presenting domain-specific code suggestions in accordance with some embodiments of the present disclosure. The example method depicted in FIG. 6 is similar to the example method depicted in FIG. 4 as it includes some of the same steps.

The example method depicted in FIG. 6 also includes presenting 602 the code suggestion via a first interface element of the plurality of interface elements, wherein a plurality of code suggestions including the code suggestion are presented based on the request, and wherein the computer program code is presented via a second interface element of the plurality of interface elements. Presenting 602 the code suggestion via a first interface element where the computer program code is presented via a second interface element can mean that the code suggestion is presented as part of a different UI element compared to the code that is currently being used authored or edited by a user. For example, the first interface element can be scratchpad window 470 and the second interface element can be window 410 as shown in FIG. 6.

In some embodiments, scratchpad window 470 can represent another editing window that is presented, for example in response to a request for a code suggestion. Scratchpad window 470 can be considered a side panel window that is used to enter code that can then be copied into a main window such as main window 410. Scratchpad window 470 can be used to enter pseudocode instructions that trigger generation of computer program code that can then be copied into main window 410 or that can be automatically added to window 410 once generated. Additionally, a user can highlight a code portion from window 410, which can cause initiation of scratchpad window 470 that can present the highlighted code so that the highlighted code can be edited separately from window 410 and incorporated later into window 410 when desired.

As shown in FIG. 6, a user can enter a request for a code suggestion using input box 412. In response to receiving the code suggestion in input box 412, IDE 112 can present scratchpad window 470, showing a code suggestion as shown in FIG. 6. The example method depicted in FIG. 6 also includes receiving 604 an acceptance of the code suggestion. Receiving 604 an acceptance of the code suggestion can include receiving an acceptance of the code suggestion presented in scratchpad window 470. For example, scratchpad window 470 can show controls to accept or reject a code suggestion presented in scratchpad window 470, similar to action prompt 430, shown in FIG. 4.

The example method depicted in FIG. 6 also includes incorporating 606 the code suggestion into the computer program code, further comprising replicating the code suggestion from the second interface element to the first interface element. In one embodiment, incorporating 606 the code suggestion into the computer program code can include automatically copying the code suggestion from scratchpad window 470 into window 411 in the appropriate location. In another embodiment, the user can copy and paste the code suggestion from scratchpad window 470 into window 411.

While scratchpad window 470 has been described above as another editing window, readers will appreciate that scratchpad window 470 can also function in other ways. For example, scratchpad window 470 can be used to perform searches that are specific to portions of the domain-specific code base, such as the portion that is in scratchpad window 470 or other portions of the domain-specific code base. Scratchpad window 470 can be used to debug code or execute code and view execution results. In other words, window 410 and scratchpad window 470 can be used concurrently to edit code, execute and debug code, and to search code and obtain references for code portions in tandem such that a user can more quickly develop different portions of the software associated with the domain-specific code base. Stated differently, different UI elements of IDE 112 can behave as different task windows. Each UI element can have a different code block but each may be editable and retain the prompt or instruction that was used to generate the code block. Code in any UI element can be moved to window 410 or saved separately.

Figure 7:
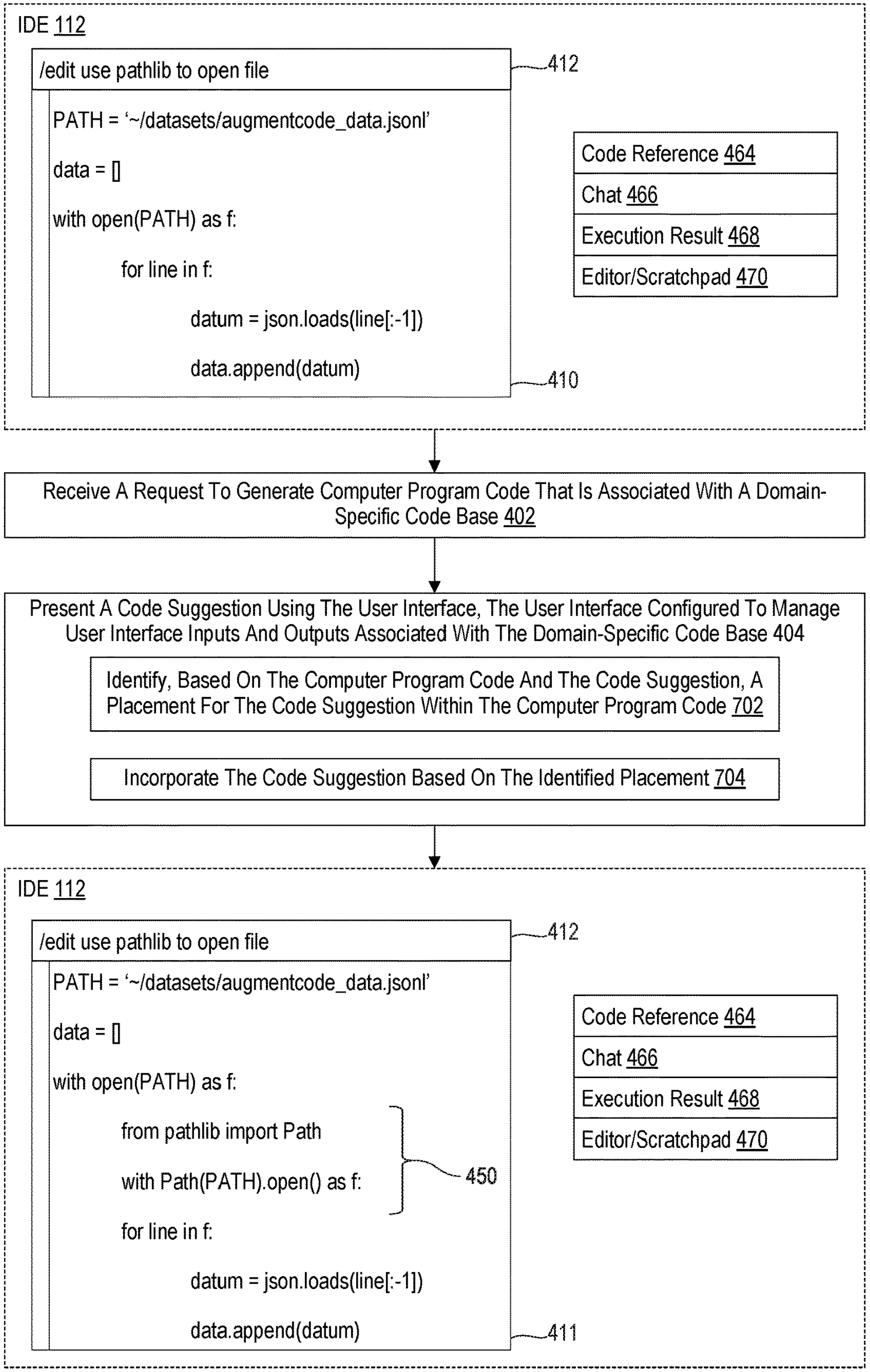
FIG. 7 sets forth a flow chart illustrating an additional example method of presenting domain-specific code suggestions in accordance with some embodiments of the present disclosure.

FIG. 7 sets forth a flow chart illustrating an additional example method of presenting domain-specific code suggestions in accordance with some embodiments of the present disclosure. The example method depicted in FIG. 7 is similar to the example method depicted in FIG. 4 as it includes some of the same steps. The example method depicted in FIG. 7 also includes identifying 702, based on the computer program code and the code suggestion, a placement for the code suggestion within the computer program code. Identifying 702, based on the computer program code and the code suggestion, a placement for the code suggestion within the computer program code can include an evaluation of where the code suggestion should be placed relative to other lines of code in the active window, such as window 410. In one embodiment, IDE 112 on client device 110 can receive the code suggestion and determine its placement within the computer program code of window 410. For example, IDE 112 may be configured to identify that the user entered "user pathlib to open file" and that window 410 included a path variable and code ("with open (PATH) as f:") indicating an opening of a file whose location was indicated by the path variable and code to iterate through the file line by line ("for line in f:"). Based on this identification, IDE 112 can determine that the received code suggestion that uses the pathlib variable would be placed between the two code portions indicating the opening of the file. In another embodiment, IDE 112 can receive placement information from, for example, server 124 that indicates where the code suggestion is to be placed relative to existing code in window 410.

The example method depicted in FIG. 7 also includes incorporating 704 the code suggestion based on the identified placement. Incorporating 704 the code suggestion based on the identified placement can include incorporating the code suggestion into existing code in window 410 (or as part of a new code file that does not include other code), thereby resulting in the state shown in window 411.

Figure 8:
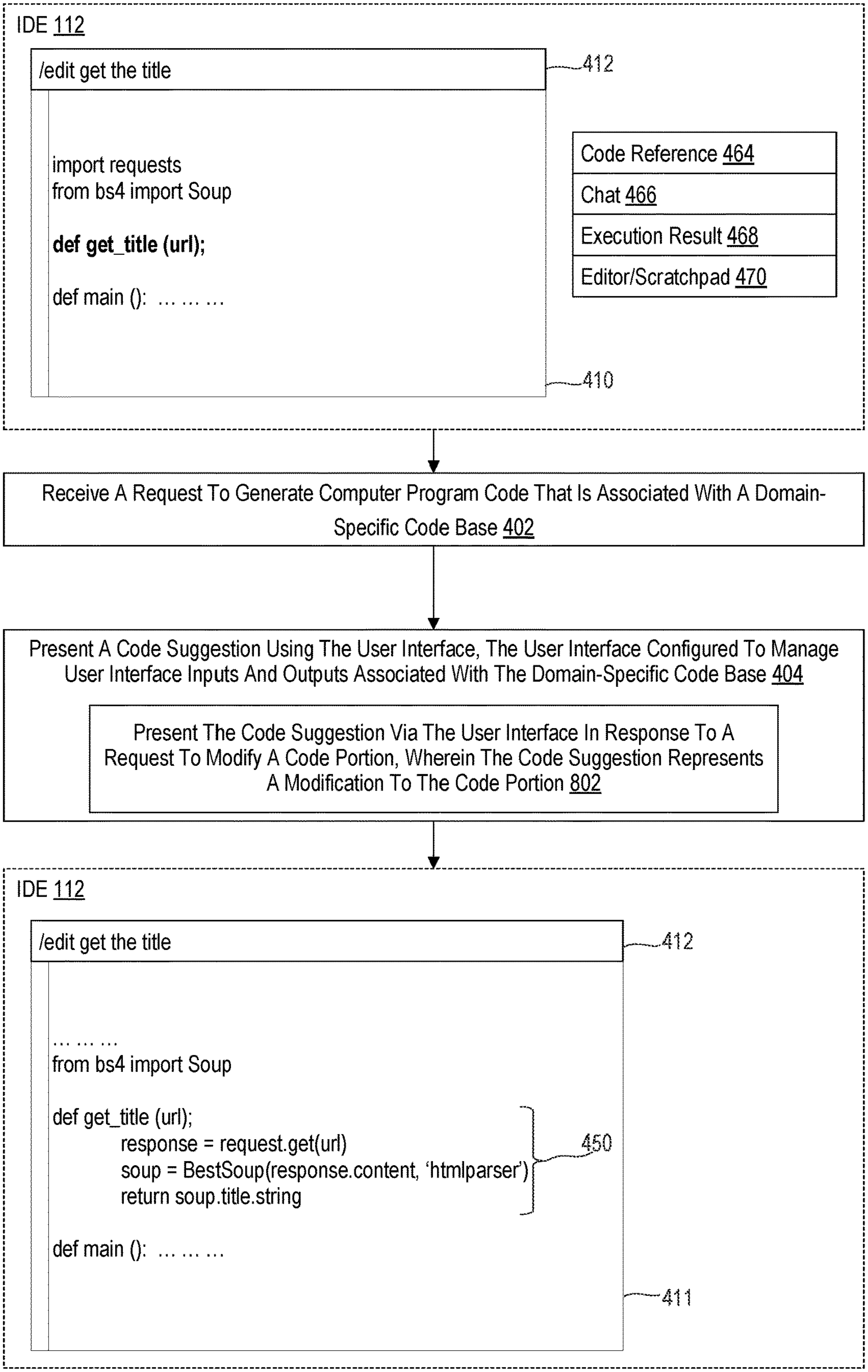
FIG. 8 sets forth a flow chart illustrating an additional example method of presenting domain-specific code suggestions in accordance with some embodiments of the present disclosure.

FIG. 8 sets forth a flow chart illustrating an additional example method of presenting domain-specific code suggestions in accordance with some embodiments of the present disclosure. The example method depicted in FIG. 8 is similar to the example method depicted in FIG. 4 as it includes some of the same steps.

The example method depicted in FIG. 8 also includes presenting 802 the code suggestion via the user interface in response to a request to modify a code portion, wherein the code suggestion represents a modification to the code portion. Presenting 802 the code suggestion via the user interface in response to a request to modify a code portion can be carried out in several ways, some of which have been described with respect to FIG. 4. For example, a user can enter an instruction to "get the title" via input box 412. This instruction can represent a request to modify a code portion, such as the code shown in window 410 in FIG. 8. For example, window 410 shows the following function "def get_title (url);" The user may then highlight this line of code.

The highlighting may serve as a request to modify this code portion. Modifications can include edits to existing code, deletions, or additions to existing code. In the example shown in FIG. 8, the user's action of highlighting the code and entering the instruction "get the title" can be interpreted as an instruction to modify the highlighted code portion by adding additional code to it. In response, IDE 112 may be configured to insert code suggestion 450 into the code, resulting in the code shown in window 411, which now includes the following lines:

```
response=request.get (url)
soup=BestSoup (response.content, 'htmlparser')
return soup.title.string
```

While the user entered only a function definition, IDE 112 then entered the code suggestion to modify this function definition and included other code forming the contents of the function as represented by the three lines of code above.

Figure 9:
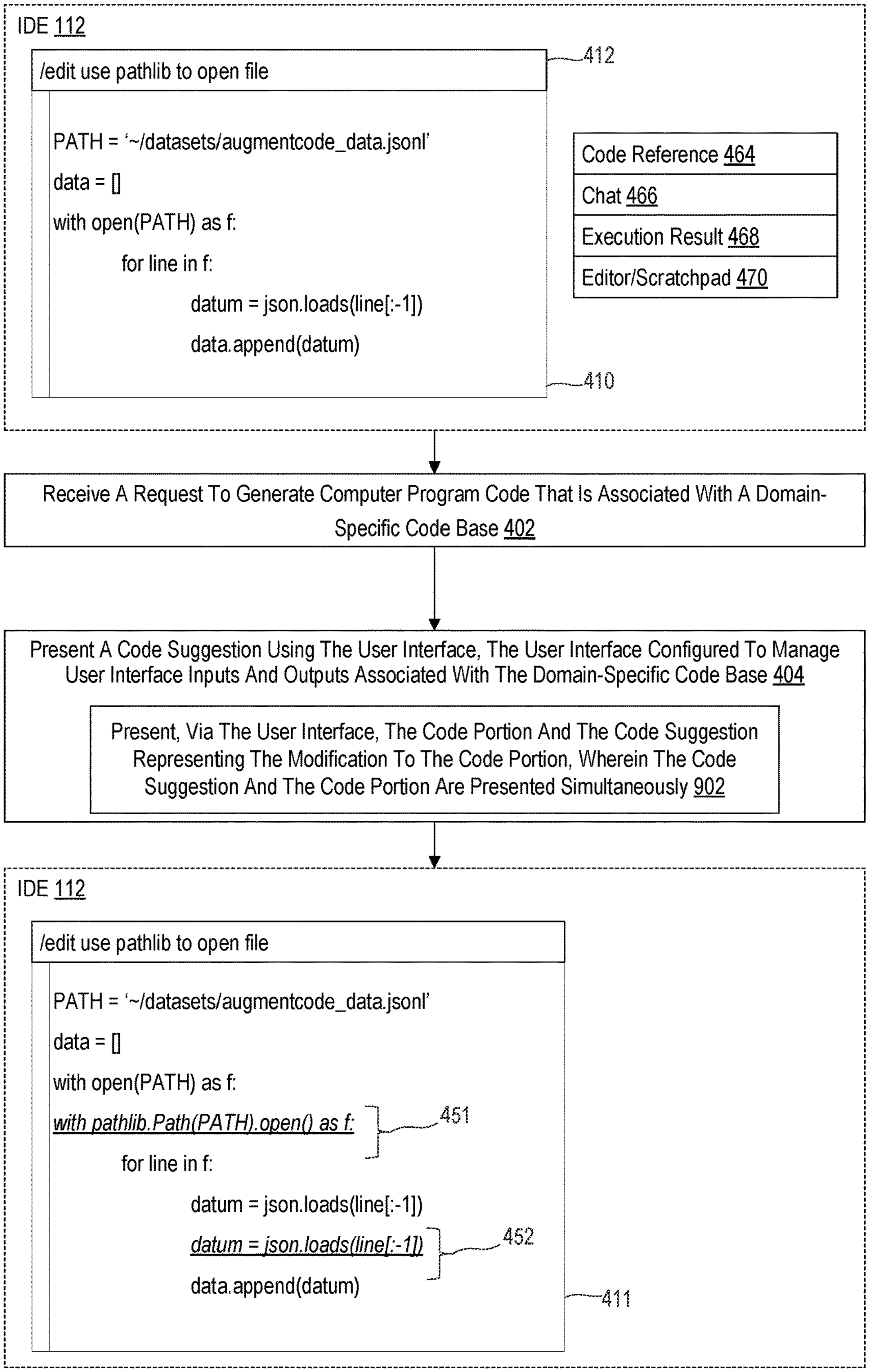
FIG. 9 sets forth a flow chart illustrating an additional example method of presenting domain-specific code suggestions in accordance with some embodiments of the present disclosure.

FIG. 9 sets forth a flow chart illustrating an additional example method of presenting domain-specific code suggestions in accordance with some embodiments of the present disclosure. The example method depicted in FIG. 9 is similar to the example method depicted in FIG. 4 as it includes some of the same steps. The example method depicted in FIG. 9 also includes presenting 902, via the user interface, a code portion and a code suggestion representing the modification to the code portion, wherein the code suggestion and the code portion are presented simultaneously. Presenting 902 via the user interface, the code portion and the code suggestion representing the modification to the code portion, wherein the code suggestion and the code portion are presented simultaneously can include presenting parts of the code suggestion adjacent to relevant parts of existing code. For example, the code portion shown in window 410 can include a number of lines of code. These lines of code may represent a method of opening and reading a file. However, a user may then enter an instruction to "use pathlib to open file", where the instruction represents another method of opening and reading the file. In response to the instruction, a code suggestion may be generated. Moreover, parts of the code suggestion may be presented adjacent to parts of the existing code such that a user can directly compare the suggested way of opening the file with the way of opening the file that was entered by the user or previously existed in the code file. As shown in FIG. 9, the existing code may have the code line "with open (PATH) as f:". Adjacent to this existing code line, a code suggestion line 451 generated in response to the user's suggestion can be presented such as "with pathlib.Path(PATH).open( ) as f", which may achieve a similar result as the code line in the existing code, except that code suggestion line 451 is generated to use the pathlib module as directed by the user. Similarly, the existing code may have the code line "datum=json.loads (line [:−1])". Adjacent to this existing code line, a code suggestion line 452 generated in response to the user's suggestion can be presented such as "datum=json.loads (line [:−1])". This is an example where the generated code suggestion line was identical to already-existing code in the code file. Readers will appreciate that, using the functionality described herein, the user can select between the provided code suggestion line or existing code, and where they are identical, the code suggestion can be ignored or deleted.

Moreover, the user's actions in response to the presented code suggestion can be interpreted in various ways. In this instance, there are two separate choices for each code line in the function, and it is likely that the user will retain one choice and delete the other. For example, where the user deletes the existing code line, the deletion can be interpreted as an acceptance of the code suggestion. Similarly, where the user deletes the code suggestion line, that may be interpreted as a rejection of the code suggestion. These user actions can form additional inferences that are provided to, for example, code generation model(s) 118 in order to assist code generation model(s) 118 in providing more contextually relevant and useful code suggestions to the user.

Figure 10:
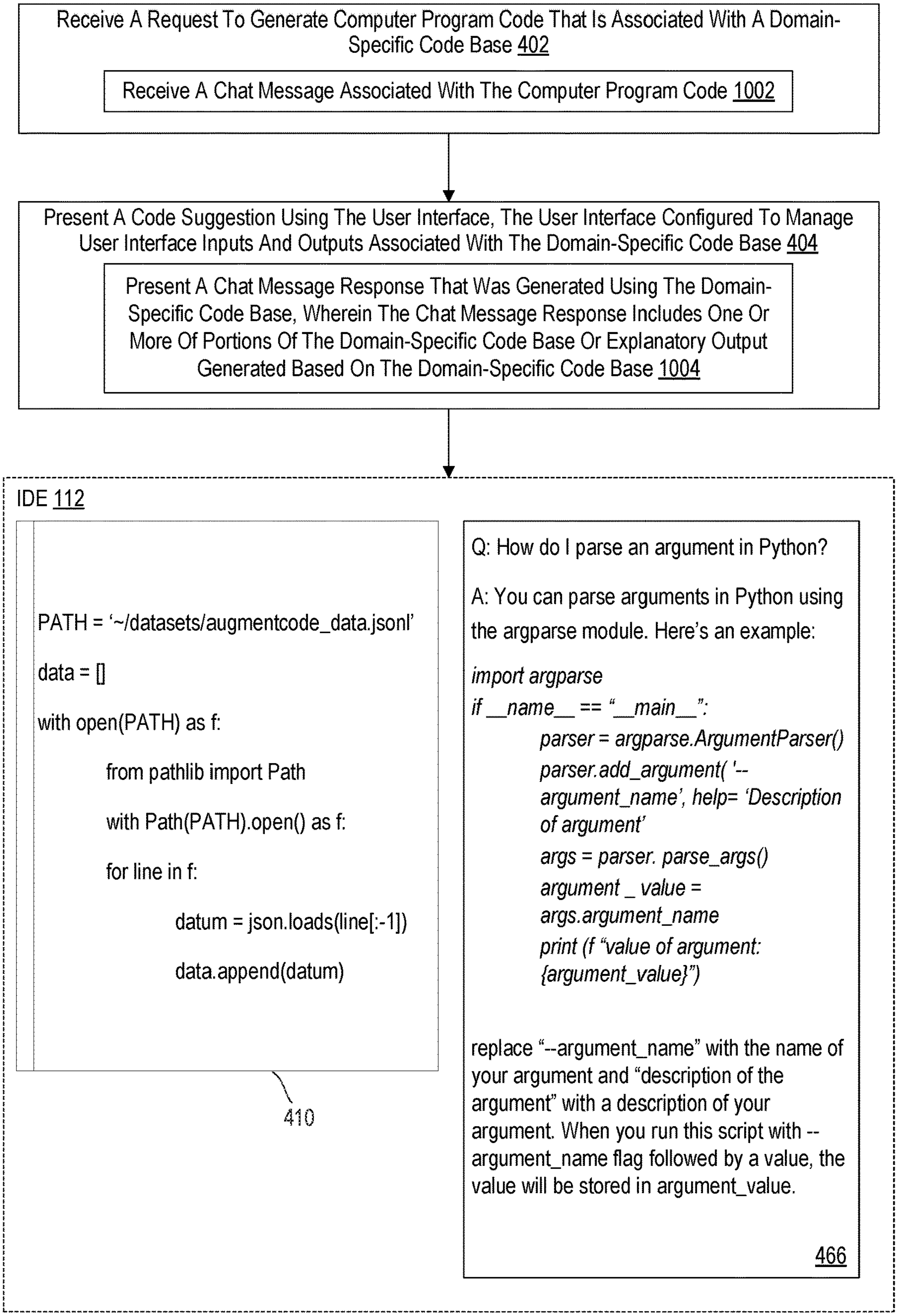
FIG. 10 sets forth a flow chart illustrating an additional example method of presenting domain-specific code suggestions in accordance with some embodiments of the present disclosure.

FIG. 10 sets forth a flow chart illustrating an additional example method of presenting domain-specific code suggestions in accordance with some embodiments of the present disclosure. The example method depicted in FIG. 10 is similar to the example method depicted in FIG. 4 as it includes some of the same steps.

The example method depicted in FIG. 10 also includes receiving 1002 a chat message associated with the computer program code. As noted earlier, IDE 112 can present functionality enabling a user to enter chat messages and receive chat-style responses pertaining to code in the user's workspace or in the domain-specific code base. Receiving 1002 a chat message associated with the computer program code can be carried out in various ways. In one embodiment, receiving the chat message can be carried out using chat window 466, shown in FIG. 10. For example, the user may enter text in chat window 466 and then press a particular key such as the Enter key, thus triggering IDE 112 to determine that the user has entered a chat message that requires a response.

The example method depicted in FIG. 10 also includes presenting 1004 a chat message response that was generated using the domain-specific code base, wherein the chat message response includes one or more of portions of the domain-specific code base or explanatory output generated based on the domain-specific code base. Presenting 1004 a chat message response that was generated using the domain-specific code base, wherein the chat message response includes one or more of portions of the domain-specific code base or explanatory output generated based on the domain-specific code base can be carried out by presenting, via chat window 466, a chat message response that can include a code suggestion, code reference, or any information that forms a proper response to the user's chat message. The information provided in the chat message response can be derived from or generated using a domain-specific code base.

Using chat window 466, the user can enter various chat messages and receive responses. Several examples of this functionality are provided as follows. For example, the user can enter a chat message of the form "How do I . . . ?" As in, the user requests assistance via chat on accomplishing a certain task. As shown in chat window 466 in FIG. 9, the chat message may be "How do I parse an argument in Python?" In response, chat window 466 can present a chat message response that includes a natural language answer to the user's question. For example, the chat message response can begin with "You can parse arguments in Python using the argparse module." The chat message response can continue with details on how to use the argparse module, such as an example usage. The chat message response can also provide an explanation of how to apply the example in the user's own code, such as by indicating what sections are to be replaced with the user's own code segments (e.g., "replace-argument_name" in the example with the name of your argument" and so on).

Chat messages can also include requests for improved code such as "is there a better/faster/shorter way to do this?" In this example, the user may highlight an existing code portion, then enter a chat message asking whether there is a better or faster or shorter way to accomplish the same task that the existing code is currently accomplishing. In response, chat window 466 can present a chat message response that could take the form of a "Yes" or "No" and if the answer is Yes, provide an example and explanation derived from the domain-specific code base that represents the sort of improvement requested in the user's chat message.

Chat messages can also include requests for analysis of existing code such as "can this code be refactored easily?" or "is there code in the repository that is better or easier to refactor than this?" In response to such questions, chat window 466 can be used to present chat message responses such as "Yes, there is similar code available that is more refactor-friendly; would you like to see an example?/here is an example" Another example can be a user's message stating "can you suggest ways to optimize this code?" in response, chat window 466 can present chat message responses such as "here are some example ways to optimize your selected code" and add code examples that are optimized for some feature (such as speed) or provide narrative explanations of how the existing code can be improved.

Chat messages can include requests to execute code. For example, the user can highlight a code portion and enter in the chat "Can you run this code?" in response, chat window 466 or another UI element can show an execution and results of executing the selected code portion. The chat message can also state "can you run this code and a suggested replacement and show me results?" In response, chat window 466 can display execution results for existing code in, for example, window 410 and for a code suggestion that is a possible substitution for the existing code.

Chat messages can also include requests for clarification or context on a provided code suggestion. For example, a user can select a code suggestion and ask, "why did you suggest this?" In response, chat window 466 can present context for the code suggestion, such as similar code portions, code references for code used to generate the code suggestion, references to coding best practices or examples that were used at inference time by code generation model(s) 118, and so on.

Chat messages can also include requests for unit tests. For example, a user can select a code portion (whether an existing code portion or a code suggestion) and ask, "Is there a unit test for this code?" In response, chat window 466 can present unit test code that can be used to run a unit test for the selected code portion. Chat messages can also include more complex statements. For example, the user's chat message can be "I don't like the code suggestion you provided. Can you provide another suggestion?" In response, chat window 466 can present an alternative code suggestion that is different from a code suggestion that was originally provided.

Chat window 466 can also be used by the user to configure code generation. For example, the user can enter chat messages such as "Don't give me multi line suggestions" with the result being an acknowledgement in chat window 466 that only single-line code suggestions will be provided unless otherwise instructed. Another example of this could be an instruction like "Just give me the one fastest code suggestion you can generate". In response, the result in chat window 466 or in window 410 can be the first code suggestion that is generated.

In general, chat window 466 can also be treated as an instruction console where a user enters natural language instructions and can receive responses to the instructions. As part of the instruct/console model, the user can enter more complex instructions such as "write code to print the contents of file X but in the style of file Y". As part of these instructions, the user can provide references to files X or Y. In response, the references to files X or Y, along with the instruction, may be processed and the results may be presented in chat window 466 or in another window. Other examples of such instructions can include instructions such as "open excel file and parse contents" where an Excel file's reference may be provided. As another example, the instruction may be to "log all retrieval results" such that in response, all retrieval results are recorded and, for example, presented via chat window 466. Another example instruction could be "add error handling". In response, error handling functionality can be added for existing code in a window such as window 410.

Figure 11:
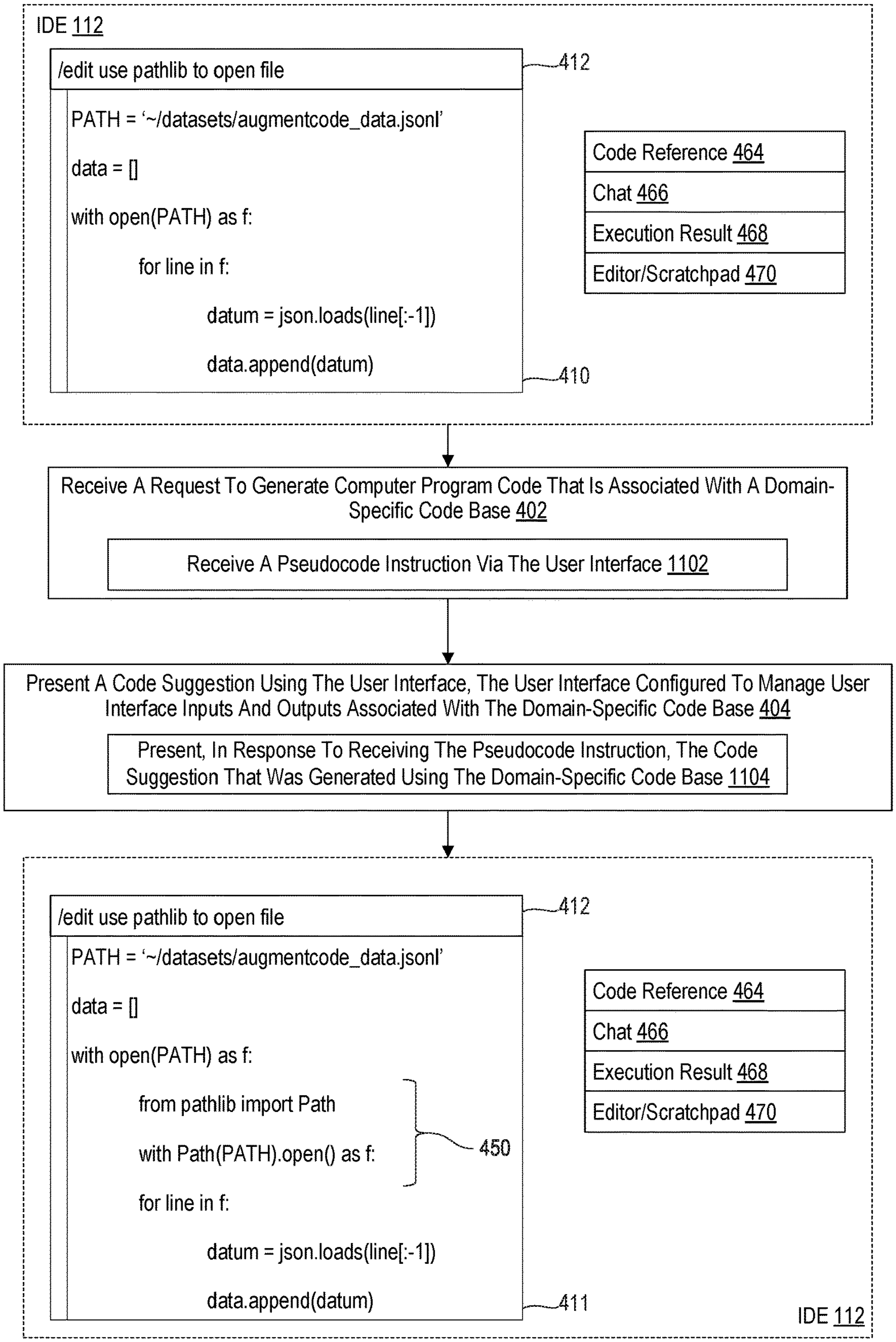
FIG. 11 sets forth a flow chart illustrating an additional example method of presenting domain-specific code suggestions in accordance with some embodiments of the present disclosure.

FIG. 11 sets forth a flow chart illustrating an additional example method of presenting domain-specific code suggestions in accordance with some embodiments of the present disclosure. The example method depicted in FIG. 11 is similar to the example method depicted in FIG. 4 as it includes some of the same steps. The example method depicted in FIG. 11 also includes receiving 1102 a pseudocode instruction via the user interface. For example, a user can enter a pseudocode instruction via input box 412 to "use pathlib to open file" or "get the title". Readers will appreciate that pseudocode instructions can be text that is code-like but lacking syntax features that are part of executable computer program code.

The example method depicted in FIG. 11 also includes presenting 1104, in response to receiving the pseudocode instruction, the code suggestion that was generated using the domain-specific code base. Presenting, in response to receiving the pseudocode instruction, the code suggestion that was generated using the domain-specific code base can include presenting a result of providing the pseudocode instruction as well as existing code or other workspace context as an input to, for example, code generation model(s) 118 and obtaining the result, which may be a suggested code portion. The suggested code portion may be presented via IDE 112. For example, FIG. 11 shows code suggestion 450 being generated in response to the pseudocode instruction to "use pathlib to open file".

Figure 12:
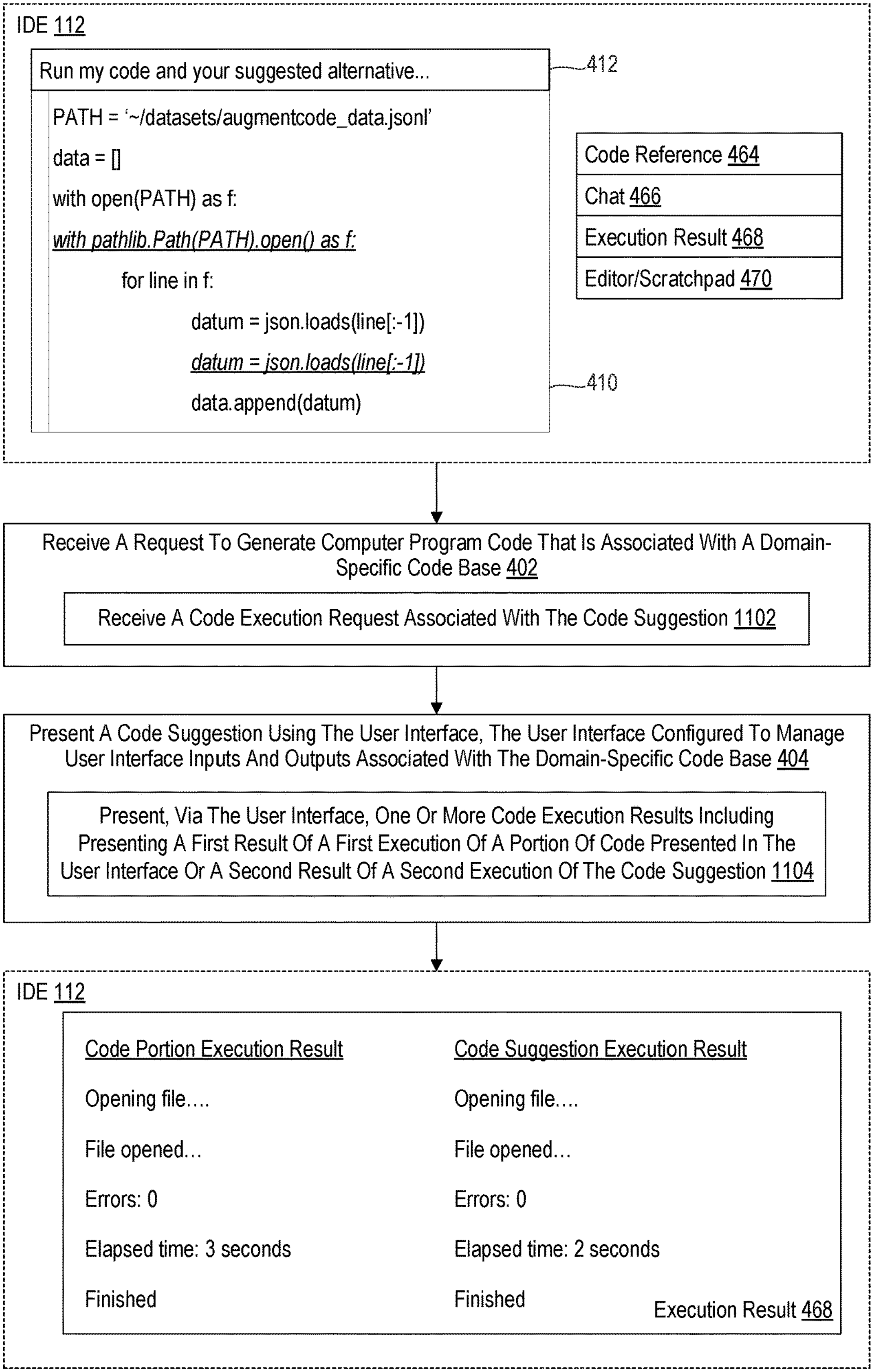
FIG. 12 sets forth a flow chart illustrating an additional example method of presenting domain-specific code suggestions in accordance with some embodiments of the present disclosure.

FIG. 12 sets forth a flow chart illustrating an additional example method of presenting domain-specific code suggestions in accordance with some embodiments of the present disclosure. The example method depicted in FIG. 12 is similar to the example method depicted in FIG. 4 as it includes some of the same steps. The example method depicted in FIG. 12 also includes receiving 1102 a code execution request associated with the code suggestion. Receiving 1102 a code execution request associated with the code suggestion can include receiving instructions to execute existing code in, for example, window 410. Receiving 1102 a code execution request associated with the code suggestion can also include receiving an instruction to execute a code suggestion that was provided. For example, a code suggestion may be shown simultaneously to existing code that the user authored, as shown in window 410. Then the user can enter an instruction via input box 412 such as "Run my code and your suggested alternative . . . "

The example method depicted in FIG. 12 also includes presenting 1104, via the user interface, one or more code execution results including presenting a first result of a first execution of a portion of code presented in the user interface or a second result of a second execution of the code suggestion. Presenting 1104 the code execution results can include presenting a result of an execution of the code suggestion that was provided. Presenting 1104 the code execution results can also include presenting another result of an execution of existing code, for example existing code that is similar to the code suggestion or that was used to prompt the code suggestion. As shown in FIG. 12, execution result 468 shows two sets of results, a code portion execution result and a code suggestion execution result. Each set of results can show a running log of actions taken, such as "opening file . . . file opened . . . " as well as results such as a number of errors encountered, a total execution time, and a status when execution has completed.

Figure 13:
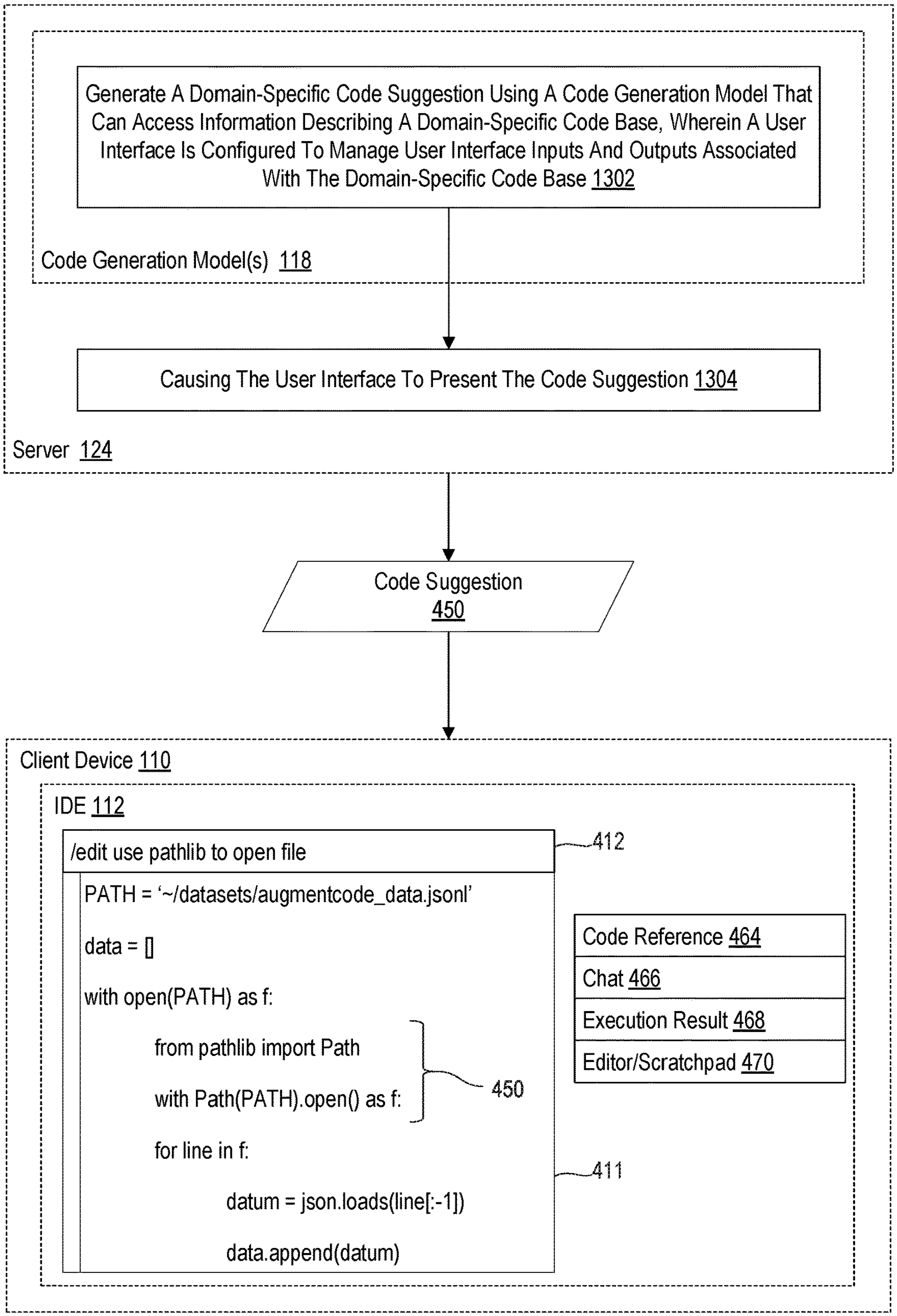
FIG. 13 sets forth a flow chart illustrating an additional example method of presenting domain-specific code suggestions in accordance with some embodiments of the present disclosure.

FIG. 13 sets forth a flow chart illustrating an additional example method of presenting domain-specific code suggestions in accordance with some embodiments of the present disclosure. The example method depicted in FIG. 13 includes generating 1302 a domain-specific code suggestion using a code generation model that can access information describing a domain-specific code base, wherein a user interface is configured to manage user interface inputs and outputs associated with the domain-specific code base. Generating 1302 a domain-specific code suggestion can be carried out by, for example, code generation model(s) 118.

Code generation model(s) 118 may include one or more machine learning models that can generate executable source code that is domain-specific or enterprise-specific. As discussed earlier, the code generation model(s) 118 can interpret and process portions of existing code in the form of input tokens. In addition, the code generation model(s) 118 can also understand relationships and dependencies between various input tokens, which form the context that the code generation model(s) 118 can use to generate contextually relevant suggested code. Readers will appreciate that IDE 112 can be a source for both the input tokens (e.g., existing computer program code) as well as other contextual information such as the position and ordering of the input tokens, open tabs in the IDE 112, and so on. Accordingly, generating 1302 the domain-specific code suggestion can involve using input tokens and other context from IDE 112 in order to generate one or more contextually relevant code suggestions.

Moreover, code generation model(s) 118 can be configured to customize the code suggestion in various ways. Readers will appreciate that while code generation model(s) 118 may be, for example, machine learning models that are trained on a corpus of enterprise-specific code, constantly retraining these models may be highly performance-intensive. Accordingly, code generation model(s) 118 may be customized 'at inference time' without retraining the models, by using one or more other items such as enterprise best practices, enterprise-specific coding "do's and don'ts", user behavior inputs, or according to certain coding examples that may or may not be part of the code base. For example, code generation model(s) 118 can be instructed to use certain software design patterns in their code generation, but not other design patterns. As another example, certain coding examples may be used in customization that are enterprise-specific (e.g., an enterprise's technical lead may develop some coding examples that are to be used as templates for software development by others in the enterprise). For example, code generation model(s) 118 can be customized to generate code suggestions that represent useful responses to code completion requests while still adhering to conventions or best practices outlined in the coding examples by ensuring that the generated code exhibits one or more forms of similarity with the coding examples.

Code generation model(s) 118 can be instructed to use certain syntactical conventions that, while not required for successful code execution, are part of an organization's coding culture or best practices or achieve certain other efficiencies in documentation or lead to quicker software development in general since all developers in the organization may use the same conventions, increasing repeatability and familiarity of code. Similarly, code generation model(s) 118 may be customized to generate code using certain industry-based conventions that may not be required for code to run properly but are commonly used in certain industries as standard practice. For example, there may be distinct coding conventions that are applied in software development in the financial industry versus in computer game development, and code generation model(s) 118 may be customized without model retraining to use these styles or cultural preferences of a certain industry or enterprise in order to generate domain-specific or enterprise-specific code suggestions. These customizations can be updated over time.

The example method depicted in FIG. 13 also includes causing 1304 the user interface to present the code suggestion. Causing 1304 the user interface to present the code suggestion can include sending, from server 124 to client device 110, code suggestion 450 generated by code generation model(s) 118. Client device 110 can then present the code suggestion via IDE 112. For example, client device 110 can present, in window 411, code suggestion 450 which corresponds to code suggestion 450 sent from server 124.

Figure 14:
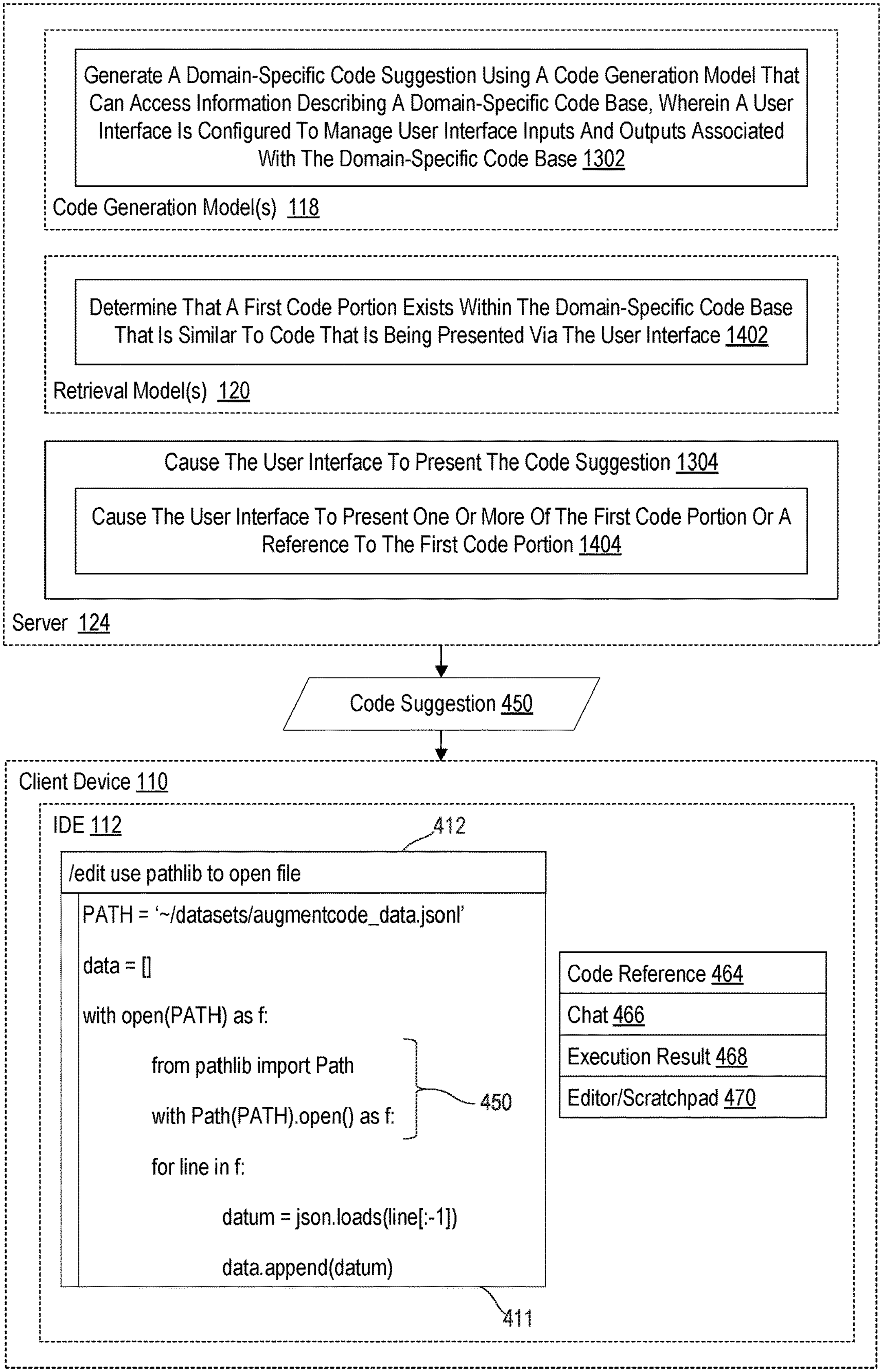
FIG. 14 sets forth a flow chart illustrating an additional example method of presenting domain-specific code suggestions in accordance with some embodiments of the present disclosure.

FIG. 14 sets forth a flow chart illustrating an additional example method of presenting domain-specific code suggestions in accordance with some embodiments of the present disclosure. The example method depicted in FIG. 14 is similar to the example method depicted in FIG. 13 as it includes some of the same steps. The example method depicted in FIG. 14 also includes determining 1402 that a first code portion exists within the domain-specific code base that is similar to code that is being presented via the user interface. Determining 1402 that a first code portion exists within the domain-specific code base that is similar to code that is being presented via the user interface can be carried out by retrieval model(s) 120 of server 124. For example, as described previously, retrieval model(s) 120 may leverage various techniques such as, for example, feature extraction to identify meaningful features from content in the enterprise's code repository and code in the code editor of the IDE 112 to perform functions such as similarity scoring or similar techniques to measure similarity between code in the code editor of the IDE 112 and the content in the data source 122. Accordingly, retrieval model(s) 120 can use these techniques to determine 1402 that a first code portion exists within the domain-specific code base (e.g., in data source 122) that is similar to code that is being presented via IDE 112.

The example method depicted in FIG. 14 also includes causing 1404 the user interface to present one or more of the first code portion or a reference to the first code portion. In other words, retrieval model(s) 120 can extract a first code portion that is similar to code that is being presented via IDE 112, and the first code portion can be presented in IDE 112 as, for example, an example of similar code that a user can use instead of existing code. For example, where a user requests a code suggestion, the first code portion can be presented as similar code that can be a code suggestion to be used in place of existing code.

Figure 15:
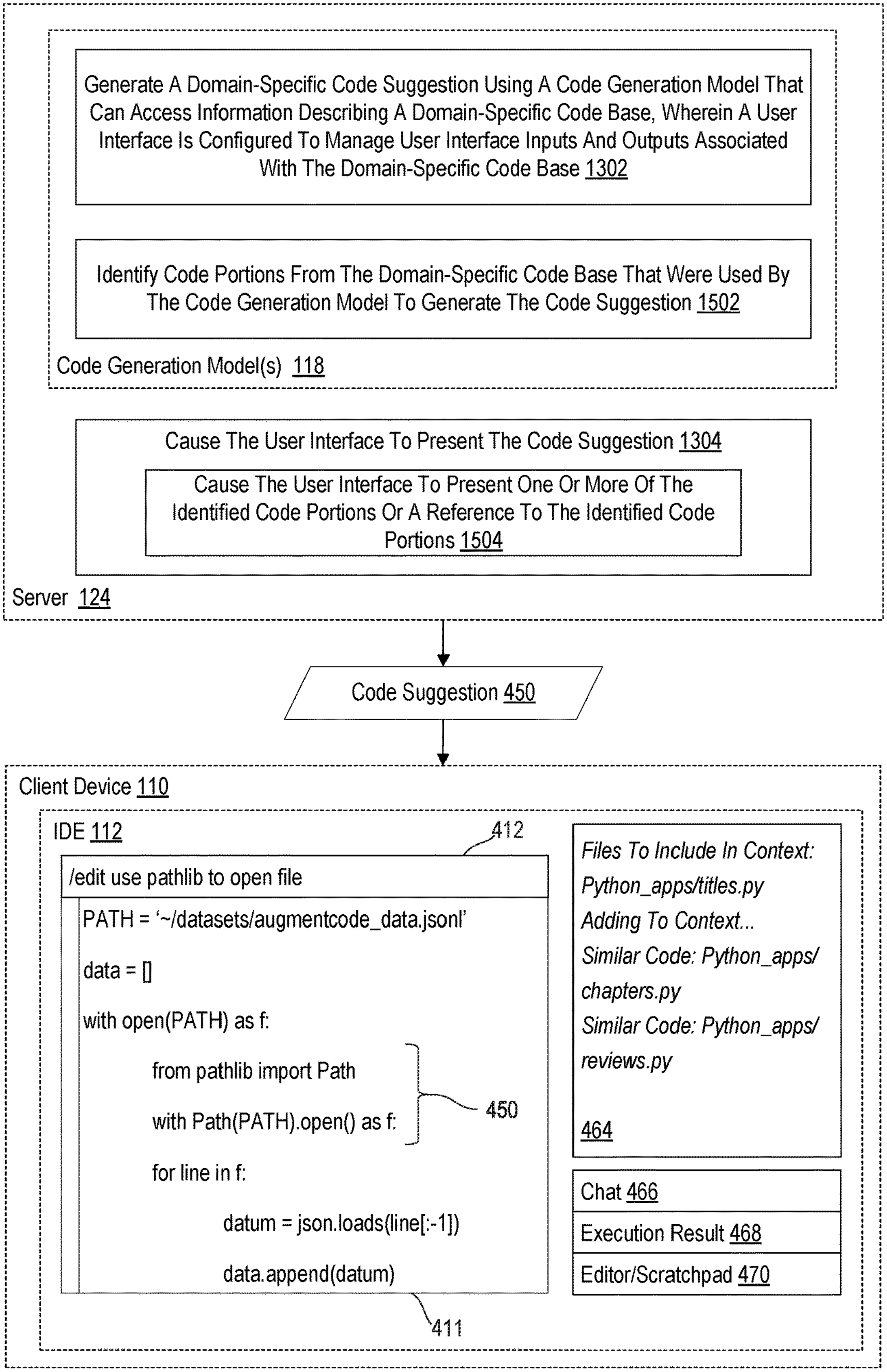
FIG. 15 sets forth a flow chart illustrating an additional example method of presenting domain-specific code suggestions in accordance with some embodiments of the present disclosure.

FIG. 15 sets forth a flow chart illustrating an additional example method of presenting domain-specific code suggestions in accordance with some embodiments of the present disclosure. The example method depicted in FIG. 15 is similar to the example method depicted in FIG. 13 as it includes some of the same steps. The example method depicted in FIG. 15 also includes identifying 1502 code portions from the domain-specific code base that were used by the code generation model to generate the code suggestion. In one embodiment, code generation model(s) 118 can identify 1502 code portions from the domain-specific code base that were used to generate a code suggestion. For example, code generation model(s) 118 can, in addition to outputting the code suggestion, also output identifiers for code files that were used by the model to generate the code suggestion. Additionally or alternatively, retrieval model(s) 120 can identify code files that were retrieved from the domain-specific code base as part of the code suggestion generation process.

The example method depicted in FIG. 15 also includes causing 1504 the user interface to present one or more of the identified code portions or a reference to the identified code portions. Causing 1504 the user interface to present one or more of the identified code portions or a reference to the identified code portions can include presenting, via for example code reference window 464, references to code files or other documentation that was used to generate the code suggestion. For example, code reference window 464 can show that "Python_apps/titles.py" was used by code generation model(s) 118 to generate code suggestion 450.

Figure 16:
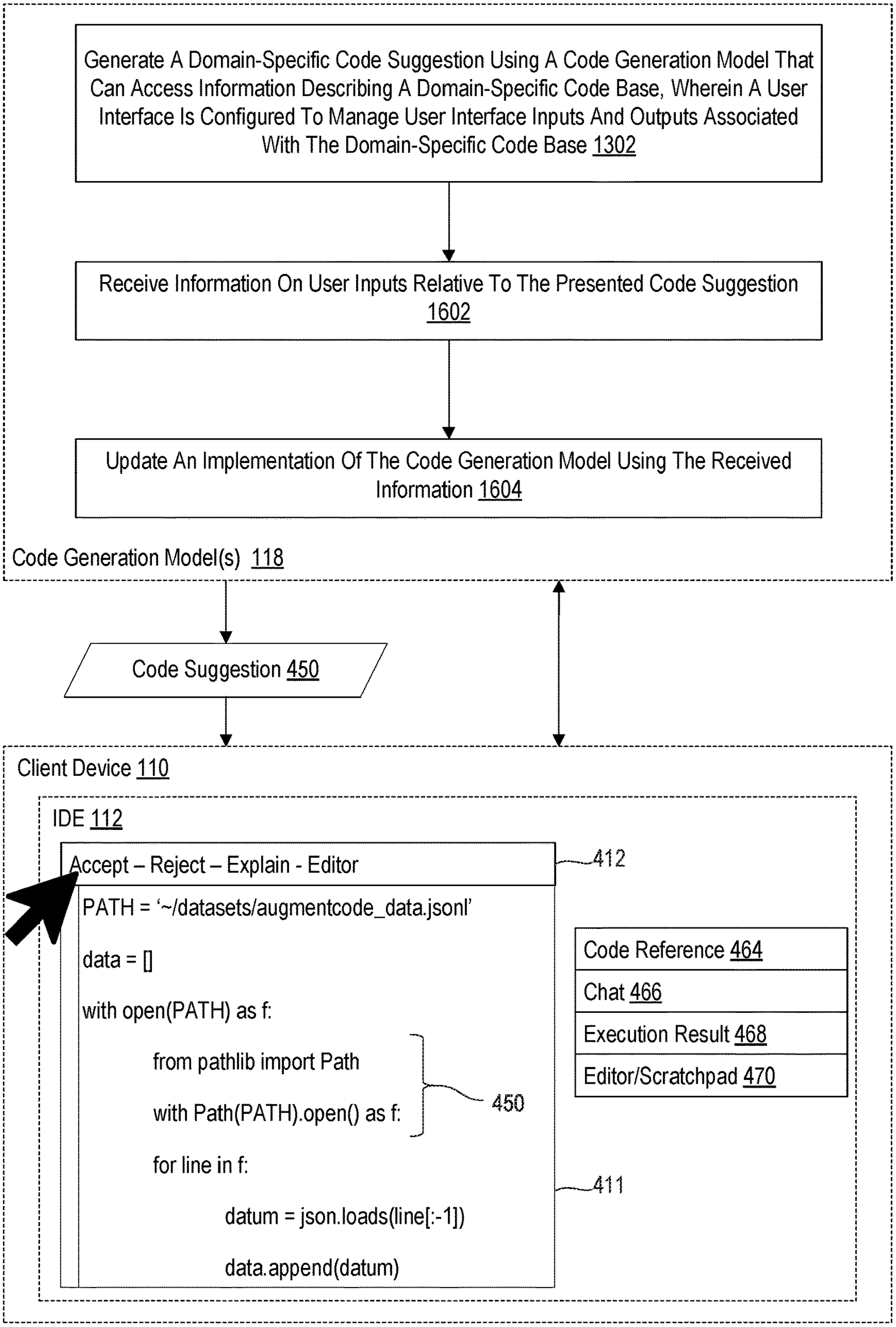
FIG. 16 sets forth a flow chart illustrating an additional example method of presenting domain-specific code suggestions in accordance with some embodiments of the present disclosure.

FIG. 16 sets forth a flow chart illustrating an additional example method of presenting domain-specific code suggestions in accordance with some embodiments of the present disclosure. The example method depicted in FIG. 16 is similar to the example method depicted in FIG. 4 as it includes some of the same steps. The example method depicted in FIG. 16 also includes receiving 1602 information on user inputs relative to the presented code suggestion.

Receiving 1602 information on user inputs relative to the presented code suggestion can include receiving user inputs via IDE 112 that indicate one or more of user preferences and interests or disinterests with respect to the code suggestions that are provided. For example, as described earlier, the user can be offered one code suggestion at a time and prompted to accept the code suggestion (as shown using the arrow key in FIG. 16) or reject it so that another one can be presented. IDE 112 can capture user preferences regarding code suggestion preferences from the user in this way. Other user behaviors can also be captured for potential use as inferential inputs to, for example, code generation model(s) 118. For example, the user's chat messages, pseudocode instructions, requests for explanation or code execution, selection of code suggestions over existing code, and other behaviors can all be captured and mined for expressions of preference for a certain code suggestion or type of code or coding style. This user preference information can be, in some cases, provided as an input to code generation model(s) 118 in order for code generation model(s) 118 to provide improved code suggestions based on the user preferences.

The example method depicted in FIG. 16 also includes updating 1604 an implementation of the code generation model using the received information. Updating 1604 an implementation of the code generation model using the received information can include updating the inferential information that is provided to code generation model(s) 118 that can be used to 'steer' the model at inference time in order to provide more enterprise-specific code suggestions. The abovementioned contextual information and user preference information can be used as inferential inputs to code generation model(s) 118. In addition, other information such as coding examples and specific configuration on enterprise best practices or stylistic preferences can be provided as well as inputs to code generation model(s) 118.

In some embodiments, in addition to presenting a user of the IDE with code suggestions, IDEs that are enhanced with the capabilities described herein may also be configured to present additional features or functionality. A number of these additional features are described below.

In one embodiment, IDE 112 may be configured to present a codebase-specific "start from empty" file that includes, for example, boilerplate code. Readers will appreciate that an enterprise may require that all code files, or certain code files, or all code files of a certain type include certain boilerplate code or comments or documentation in addition to code authored by a user. For example, a user may provide an instruction like "start new JavaScript". In response, IDE 112 can present a new JavaScript file but prepopulated with domain-specific code insertions and style.

In another embodiment, IDE 112 can support the ability to make multiple edits to different code files. For example, a user can use chat or another UI element to instruct that "rename all files in workspace with today's date" or "import argparse module in files A, B, and C". In response, IDE 112 can carry out the requested changes and present a result of the edits made to the identified code files. Changes can be viewed one file at a time. Moreover, IDE 112 may be configured to send a request for similar code files, code references, or other information to server 124 based on the instruction. In response, retrieval model(s) 120 or code generation model(s) 118 can, for example, identify additional files that should be edited in a similar way. For example, IDE 112 can then receive identifiers for those files and present a message such as "You asked to import the argparse module in files A, B, and C. We found that files D and E are similar. Would you like to import the argparse module in files D and E as well?"

In another embodiment, IDE 112 can be configured to present an onboarding module for a new employee at the enterprise. For example, a new employee can start IDE 112 and enter a chat message such as "My name is Ali. I will be working on the team website. Can you onboard me on to the web design team?" In response, IDE 112 can parse the input, send one or more requests to server 124. IDE 112 and retrieval model(s) 120 or code generation model(s) 118 can then, on the fly, generate a step-by-step onboarding module or course for the new employee. For example, IDE 112 can present one or more code portions (which may be code suggestions or existing code from the domain-specific code base) at a time for the employee to review. Alongside the code portions, IDE 112 can present explanatory or other narrative comments to guide the employee, such as instructions to read certain code portions, to focus on certain aspects, to understand certain stylistic preferences in the code, to highlight boilerplate code that is added, and so on. In a related embodiment, IDE 112 may provide the ability for the employee to enter chat messages and receive chat-based education on code portions or other aspects of the code base.

In another embodiment, IDEs that are enhanced with the capabilities described herein may also be configured to present a chat bot or virtual persona that represents one or more human members of the enterprise. Users, such as developers on a software team, may exhibit certain coding behaviors such as those described previously. These behaviors can form inferential information that can be input to code generation model(s) 118 in order to create an avatar of the software developer that is a virtual person or 'ghost' whose coding behavior and preferences mimic those of the actual human developer. Such an avatar can be used to guide a new employee through the code base and make code suggestions as needed. Additionally, such an avatar can also serve as a virtual peer reviewer. In such cases, a user can author some code and then ask a specific avatar (e.g., via chat) for feedback. For example, the new employee mentioned above, or any employee in the enterprise, can write some code and then enter in the chat "I want this code to be reviewed by David, my manager" or "David, can you please review this code and give me feedback? Please suggest improvements". In response, IDE 112 may be configured to present chat responses that are not just generated based on a generic retrieval and code generation from the domain-specific code base, but that are based on code files that were created by only the specific individual that was in the user's request, and those retrieved code files only may be used to generate code suggestions in response to the user's request. Moreover, the process of generating the code suggestions may be customized based on the coding behaviors and preferences exhibited over time by the human software developer named David.

While the description of the above embodiment includes a single virtual persona, readers will appreciate that a team of people can be virtualized into a team persona or avatar that can be used to provide similar functionality. For example, a user can enter a chat message stating, "I want this code reviewed by the network engineering team" or "I want code suggestions on this code from the storage engineering team". In response, IDE 112 in conjunction with retrieval model(s) 120 or code generation model(s) 118 can generate and present a team persona representing the network or storage engineering team at the enterprise. This team avatar can then be used to review the code and present suggestions such as in the form of chat or console responses. More specifically, retrieval model(s) 120 can retrieve code files that were created by only the specific teams that were in the user's request, and those retrieved code files only may be used to generate code suggestions in response to the user's request.

Additionally, the suggestions presented by the avatar can be tested using IDE 112. For example, the user can request that a single code suggestion be provided from the aggregated group of users represented by a single avatar. The user can then request that a unit test be provided for the single code suggestion. In a related embodiment, the user can loop through a number of code suggestions and request a unit test for each one such that the user can stop testing once a test is passed by a code suggestion.

Moreover, the user can even customize the generated avatar by adding or removing specific users. For example, the user can enter an instruction stating, "Can the network engineering team (except for Maria) give me suggestions on this code?" In response, IDE 112 can present code suggestions generated based on retrieved code files that were created by all members of the specified team, while excluding code files from the team member specified in the user's request.

In another embodiment, IDE 112 can also present a timeline of changes to any given line of code. All event history related to a code portion may be recorded and linked together (e.g., in a data structure or database). For any given line of code, IDE 112 can present metadata in the form of, for example, tags or links that can be interacted with to see more information on how a line of code was developed. For example, the tags can show a history of code completions, related chat messages, and so on. Moreover, IDE 112 can present a timeline of these changes whereby a user can scroll backward or forward on the timeline to see the evolution of that code portion.

In another embodiment, IDE 112 can also present a working session for two or more human developers that are working together on a code file. The working session can open, for example, a separate tab or window that can show a record or log of the team's work, team chats, certain code portions, and so on. The human developers can also introduce an avatar or virtual assistant into the working session, and any one of the human developers can ask the avatar for code suggestions or other information, with the interaction being logged in the working session.

In another embodiment, IDE 112 in conjunction with retrieval model(s) 120 or code generation model(s) 118 can keep code up to date in view of code changes to other portions of the domain-specific code base. For example, whenever there is a code change to a code portion, the system may be configured to detect whether the code change creates a new dependency for code that is currently being edited by the user. The user can be prompted to update the user's code in response to the update. Additionally, a code file can be automatically updated in response to the code change even if a user is not currently editing the code file. For example, in response to any code change, dependencies on other code files may be detected, initiating a code migration plan which can include updating one or more code portions, executing the updated code in a testing environment, and presenting a progress report that reports on all the changes and any changes to performance (e.g., performance improvements or regressions etc.).

In another embodiment, IDE 112 can present code of the domain-specific code base at different levels of abstraction or at different 'zoom levels'. IDE 112 can, for example, present some or all of the domain-specific code base at a class level, providing a class-level summary showing links between classes or a map or chart showing connections between various code files or code portions. IDE 112 can present controls for a user to 'zoom in' or 'zoom out' of portions of the domain-specific code base so that the user can review the domain-specific code base at various levels of abstraction.

In another embodiment, code refactoring, deduplication, or deletion functionality can be enhanced using the features described herein. For example, retrieval model(s) 120 or code generation model(s) 118 can be configured to receive identifiers for one or more code portions and determine whether there is duplicate code in the code base that can be deduplicated. Retrieval model(s) 120 or code generation model(s) 118 can also determine that a code portion, while not a strict duplicate of other code, is still unnecessary due to later abstractions in other code that make the code portion a candidate for deletion. In a related embodiment, in response to a detection of code duplication, code generation model(s) 118 can be configured to generate a shared component (e.g., a shared class) that two code files can reference instead of maintaining some duplicate code in each code file.

In another embodiment, code coverage or test coverage for portions of the domain-specific code base can be defined and applied to all code portions that are entered by users. As an example of code coverage, it may be ensured that some or all of the functions in a code file or set of code files are tested, whereby testing functions with different input parameters are included to test logic. Accordingly, IDE 112 may be configured to insert testing functions into code that the user is authoring based on a level of code coverage that is desired. As an example of test coverage, a level of adherence to functional requirements for the project can be defined. As another example, branch coverage that covers branches of the code, such as complex structures like loops and conditionals, can also be defined at various levels. According to these defined levels, IDE 112 can test the external behavior of code authored by the user for the defined level of requirements adherence and or execution of code branches, for example.

In another embodiment, IDE 112 can provide functionality whereby the user can ask (e.g., via chat message) for the IDE 112 to 'mirror' the user's coding actions and suggest any changes. For example, the user can define a scope of the suggested changes (e.g., a particular method, or a particular file, or a set of files, or the entire code repository). Within the defined scope, the user can make requests such as "I am changing this variable name in this method/file/set of files. Update all instances of this variable name" or "I am refactoring this code. Refactor similar code throughout the repository in a similar way".

Readers will appreciate that while some the examples described above relate to embodiments where a client device leverages an IDE 112 that is used to receive suggested code and present code completion recommendations to a software developer or similar user, readers will appreciate that other embodiments are within the scope of the present disclosure. More specifically, the server or code generation model(s) 118 may be used to provide suggested code or code completion recommendations to other entities (e.g., clients other than an IDE 112 on a client device). Readers will appreciate that the client may be any type of a software development tool that software developers (or other entities that create software/code) interact with. Clients may include not only IDEs, but also code review tools, code hosting tools (e.g., GitHub), collaboration tools (like Slack or Notion), AI agents, and so on. Readers will further appreciate that a client of the server or code generation model(s) 118 may run, for example, on a software developer's computer (as is the case with an IDE), on a server or in the cloud (e.g., code review tools, code hosting tools, AI agents), or in some other environment.

In some embodiments, a client device presents content to a user via one or more output devices (e.g., a display, a speaker, a tactile feedback system, etc.) and receives one or more inputs from a user through one or more input devices (e.g., a keyboard, a touchscreen, a mouse, etc.). In various embodiments, content presented to the user via the client device is retrieved from one or more files locally stored by the client device. The files from which content is displayed to the user are obtained by the client device from a server or from another source in some embodiments. In other embodiments, the files are locally generated at the client device based on inputs received from the user and stored by the client device. In various embodiments, the client device includes one or more volatile or non-volatile storage devices for storing files generated by a user or obtained from another source.

A server used in some embodiments may include a trained model and a knowledge base. The knowledge base may include, for example, information describing the code base of a particular organization, business unit, or other entity. As further described herein, a trained model may be applied to a corpus of tokens, such as words, and outputs data (ultimately generating computer program code or recommended computer program code). Additionally, a trained model may receive input comprising tokens, such as multiple words, and outputs one or more suggested tokens that are based on the input token. When generating one or more suggested tokens, the trained model can account for both the input tokens and information contained in the knowledge base, allowing the trained model to account for a greater amount of information, both from the knowledge base and from the input tokens, to generate the suggested tokens.

In various embodiments, the server includes one or more graphics processing units ('GPUs') that execute instructions comprising one or more trained models. In other embodiments, the server includes one or more processors that execute instructions comprising one or more trained models. Further, in various embodiments, the server includes an application programming interface ('API') layer that exchanges data with one or more client devices. For example, the API layer may receive one or more input tokens from a client device and routes the one or more input tokens to one or more trained models; one or more output tokens from a trained model are obtained by the API layer, which transmits the one or more output tokens to the client device. Further, the API layer may receive files that are provided to a trained model, which may generate information describing an organization's code base that are stored in the knowledge base.

Reader will appreciate that while many of the embodiments described above relate to embodiments where information describing a domain-specific codebase is used to generate suggested code or code completion recommendations, in other embodiments, other types of natural language-based content may be generated. For example, the model(s) described here (or other/additional models) may be used to generate explanations, documentation, dialog, code review comments, or some other type of natural language-based content that can be improved by using knowledge of the domain-specific codebase. In such a way, the natural language-based content may be tailored to include information associated with the domain-specific codebase, the natural language-based content may be associated with particular code from the domain-specific codebase, or the natural language-based content may otherwise be generated in a way that has awareness of the domain-specific codebase.

To leverage a corpus of tokens (e.g., words) available to the trained model, the trained model may access tokens or other information from the knowledge base, which may be embodied as words, phrases, or other data in various embodiments. In some embodiments, the content in the knowledge base is obtained from enterprise-specific files or data (e.g., such as the contents of an enterprise-specific code base), allowing the knowledge base to reflect enterprise-specific usage of tokens, combinations of tokens, and so on. In some embodiments, the source of the tokens includes text data from which tokens (e.g., words) are obtained, while in other embodiments a trained model is trained using images to which the trained model is applied. The knowledge base may allow the trained model to subsequently make use of the enterprise-specific examples of code to generate an output when an input is received. In some embodiments, other information may be included in the knowledge base or used to generate content in the knowledge base. For example, other files related to the files of code, such as documentation, may be included in the knowledge base (or used to generate content contained in the knowledge base or to generate output by a trained model) in various embodiments. Furthermore, files relating to a particular field, such as legal documents, a question-and-answer knowledge base, mathematical reasoning, or information may be retained in the knowledge base or used to generate content in the knowledge base.

In various embodiments, all content in the knowledge base or used to generate content in the knowledge base is associated with a particular enterprise, providing an enterprise-specific corpus for training one or more trained models and for generating output from the one or more trained models. Having an enterprise-specific information allows the trained models and the knowledge base to reflect token usage and syntax tailored to the particular enterprise. This allows the trained models to account for enterprise-specific characteristics or preferences when generating output tokens from input tokens.

In some embodiments such as in a development environment, the knowledge base includes source code files (or content generated from such source code files) that include code for execution by one or more processors. In some embodiments, the knowledge base includes documentation describing one or more of the source code files (or content generated at least in part based on such documentation), files describing issues tracked with one or more source code files (or content generated at least in part based on files describing issues tracked with one or more source code files), files describing revision histories to one or more source code files (or content generated at least in part based on files describing revision histories to one or more source code files), or other information. Inclusion of such content in the knowledge base allows the trained models to account for more contextual information to supplement received input tokens. This allows the output tokens from the trained models to better account for the environment in which the trained models are executed by increasing an amount of information about the environment that is described by the content of the knowledge base.

Readers will appreciate that generative AI systems described here may make use of neural networks (e.g., Recurrent Neural Networks ('RNNs'), Generative Adversarial Networks ('GANs'), and so on). Generative AI systems may leverage models that have been trained on large datasets of existing content to understand patterns, styles, and structures. For instance, a text-based generative AI model may be trained on a corpus of books, articles, or other written/digital content to generate coherent and contextually relevant text. Likewise, a generative AI model that is designed to generate computer program code may be trained on public code bases, private code bases, or combinations thereof.

In embodiments where generative AI (in the form of one or more models, one or more services, one or more software modules, or any combination thereof) is used to generate computer program code, models may be trained on a knowledge base that can include, for example, an organization's existing code base. In some embodiments, however, when the generative AI is being tasked with generating code, the model may not be able to access the entire knowledge base due to the size of the knowledge base and limitations around how much information can be passed to the model at inference time. For example, while the model may leverage the entire code base at training time, the amount of additional information that can be passed to the model at inference time may be limited, which can present issues especially where the knowledge base is dynamic (e.g., like the dynamic code base of an organization).

Readers will appreciate that in some embodiments where generative AI systems are used to generate computer program code, models may be trained on a code base (including the code base of a particular business, a particular business unit, a particular developer or group of developers, and so on). While such a code base may change, such change may occur over a non-trivial amount of time such that while the code base is not static, the code base does change slowly. For example, a particular business organization is unlikely to rewrite their entire code bases daily. As such, in some embodiments, caching and offline processing of a particular code base may be leveraged. In these embodiments, various computations may be performed offline.

Consider an example in which a user of the generative AI systems is writing some code segment (e.g., a function) and the generative AI system is tasked with recommending some code snippet that can be inserted into the code that is being developed (i.e., the generative AI system is task with performing an auto-completion function for some code that is being written). In this example, computations that are related to identifying characteristics of code that is contained in the code base may be done offline and the results of those computations may be cached (at least partially), so that the results of those computations can be leveraged when suggesting code to insert—without needing to inspect the entire code base constantly as the user develops code.

In a similar manner, other computations (e.g., those that are associated with detecting the intent of a user that is developing code, those computations that are otherwise associated with analyzing a code base) may be performed offline and cached. In this example, the term 'offline' can include at times other than when the generative AI system is attempting to generate output. For example, the computations could occur at some time other than when the generative AI system is evaluating code that is being developed by a user and recommending code that could be inserted into the user's code.

Through the usage of offline processing and caching, the systems described here can pre-compute things, partially cache them, and even perform relatively cheap updates on the fly to have very powerful models that are fast and current. For example, any kind of latent representation that reflect an understanding of the code base can be precomputed and cached to understand what different pieces of the code base can do, to generate summaries of the code base, analysis of the code base, chains of thought related to the code base, and so on. Reader will appreciate that because neural networks transform discrete input (e.g., tokens) into embeddings, the cache could be structured so that what we cache is an intermediate latent representation (i.e., some simplified version of input) rather than something that would be sent to a user of the system such as a software developer, where that intermediate latent representation could be used for a variety of purposes later on.

In some embodiments, generative AI systems may be enhanced through retrieval augmentation that allows for efficient retrieval and filtering of relevant pieces of code that may ultimately be presented to a user for inclusion in some code that the user is developing, or otherwise included in some code that is being generated. In some embodiments, separate models may be trained to do the retrieval. These models may be used, for example, to look at a piece of code (i.e., code that is being written by a developer), compare it to some other code/search the knowledge base for the most relevant piece of code, and then present that relevant piece of code to the developer. To train these retrieval models, the models may need to be provided with many examples of code that is related so as to enable the model to identify related code. To generate a signal that relates two pieces of code, some embodiments may examine existing code repositories and look at each change that is made in the code repository and identify situations in which changing a first piece of code was followed by a second piece of code being changed, as this may be indicative of the first piece of code and the second piece of code being related. This may be especially true in some situations such as, for example, when the same user changed each piece of code in a relatively short period of time. In these embodiments, commit histories from a code management system may be examined to identify the activity described above, or other data sources may be examined to identify activity that may be taken as a signal that some pieces of code are related. In other embodiments, other information may be indicative that some pieces of code are related. For example, if two pieces of code are described in the same document (e.g., a design document), this may be an indication that the two pieces of code are related. Readers will appreciate that such signals (and other signals) may be fairly specific to code rather than language generally, so these signals may be more useful when training retrieval models that are part of a generative AI system that generates computer program code.

Readers will appreciate that in some forms of generative AI (e.g., autoregressive language models), a user may be editing a document with their cursor in a particular location. In these embodiments, the generative AI application may know what came before the cursor and may be attempting to determine what comes next. With code, however, the user of generative AI system that generates code may be editing some code segment with their cursor in a particular location of the code that they are developing. The generative AI system that generates code may benefit from knowing not only what came before the cursor, but the generative AI system may also benefit from understanding what comes at some point after the cursor—as the generative AI is attempting to determine what comes in the middle of those two code portions. As such, embodiments of the present disclosure may be configured to analyze code, come up with examples of code that is aligned with what a user would want to do, and training models on that dataset. Such a process may, in some embodiments, involve statically analyzing existing code (i.e., code from a user's code base) to pick out some fill-in-the-middle ('FIM') examples. For example, the models may be trained with examples of what is typically written between a set of parentheses, examples of what is typically written inside a loop, examples of what is typically written to complete a function, and so on.

In some embodiments, the generative AI systems described here may leverage a set of static code analysis heuristics that work well and can be used to create a dataset that is useful for training models uses by generative AI systems that can do FIM for computer program code. In these embodiments, models are trained and training sets are generated to cover sampling at multiple levels of hierarchy (parenthesis, functions, class, etc . . . ). The training sets are also created with a distribution that is similar to a distribution that would be similar to a user's knowledge base (i.e., their code repository) so that models behave in accordance with the appropriate distribution.

Readers will appreciate that the fact that code is structured may be particularly useful in FIM applications. In particular, because code has a lot of structure, the systems described herein may be leverage that structure to identify semantically meaningful expressions, figure out where they begin and end, and accuracy of the models may be improved by leveraging the knowledge of such structure.

In some embodiments, transformer models that are used by the disclosed generative AI systems may use Multilayer Perceptron ('MLP'), Transformers with cross attention, or other components. These components can frequently use large amounts of computing resources. At inference time, one vector that represents a token that is being processed is passed through a leaf matrix and a tensor is output, which is subsequently passed through another matrix. Embodiments described herein may sort the entrance of this matrix so that similar rows are close to each other and placed into buckets. Readers will appreciate that after an activation function, all negative values are zeroed out and there are frequently only very few positive values (1-5%). In some embodiments, the relatively small number of buckets that produce positive values can be identified and only those buckets may be used in subsequent computations. Furthermore, estimations may be made regarding which buckets will produce positive values, thereby drastically reducing the amount of the amount of compute necessary. An example is depicted in the figures.

In some embodiments, retrieval can be enhanced using static analysis of code as described above. Readers will appreciate that some embodiments go beyond this straightforward usage of static analysis. For example, in some embodiments static analysis will be combined with fine tuning of code models. Readers will appreciate that retrieval can be leveraged to show things to a model, but if the model wasn't specifically trained to use that kind of information, results may be less than ideal. To improve results, in some embodiments models that are part of the generative AI systems described here may be trained on the type of information that retrieval models can retrieve (e.g., while some embodiments can do static analysis and pull up some functions definitions, other embodiments may involve the additional step of training the model to use those function definitions). In addition, a dense retriever may be trained to imitate that behavior (i.e., using static analysis to retrieve), but it is just one signal that is leveraged by the model. This embodiment may be more flexible than doing static analysis-based retrieval because a neural retrieval model has the ability to weigh how important it is to generate some function based on static analysis, but the neural model also can use other considerations as signals. The model may therefore combine different signals into a single model (e.g., static analysis+detecting whether two pieces of code are related based on them being described in the same model+other signals). Essentially the static analysis is just one signal, but the model takes other signals into consideration as well. In embodiments where a dense retriever is trained as described here, at inference time it may not be necessary to do the static analysis in real-time.

Readers will appreciate that one aspect related to generating code that is distinct from generating natural language text is that code can be executed. In fact, in some embodiments code may be executed to provide valuable signals to one or more models that are used by a generative AI system. For example, if the code that was generated by a generative AI system doesn't compile, this is a powerful signal that one or more models that are used by a generative AI system didn't generate valuable out. Such signals may not be present in other generative AI domains (e.g., general text generation).

In some embodiments, code compilation and/or code execution may be used as signals for various models that are used by the generative AI system, including code generation models, retrieval models, and so on. In fact, code compilation and/or code execution may be used in the training of various models, or as input signals when the trained models are being utilized. Code compilation and/or code execution can be used, for example, to identify relationships between code segments (e.g., a code segment can be executed to see what other functions are called as a result of running that code segment). This is one example of a signal that could be generated by code execution. Other examples can include providing a stack trace in model training or as input to a trained model during model execution, providing error messages in model training or execution, and so on. In some embodiments, the execution of code could be periodically stopped to not only check its state but to use that state for model training and execution.

Readers will appreciate that running code models/language models can be a slow process as tokens are generated one at a time. For example, models may receive a question, crunch through it and predict the next word, then the next word, then the next word, and so on, such that this process becomes highly serialized. Embodiments described here may leverage speculative decoding that takes advantage of the fact that many words are easy to predict (e.g., the). In order to leverage speculative decoding, a small, simple model may be used to generate some potential outputs (e.g., in response to a cursor being at some location within a code segment) and then larger, more highly tuned models may be leveraged to sift through the speculatively generated output-keeping the good ones and tossing the bad ones.

In some embodiments, speculative decoding may leverage any small type of 'small' model in the sense that executing the model is not as resource intensive as executing larger, more complicated models. In some embodiments, the small model is a scaled down version of a larger model, but in other embodiments the small model is not a small version of the larger model. For example, the small model may be embodied as a classical model from machine learning (i.e., a model that is not a neural network) that is trained on the requests of a user of the generative AI system. Such a request may include some number (i.e., a few thousand) of tokens: here is what the current file of the user looks like, here is where the cursor is located and where we want to generate code, and so on. In some embodiments, those tokens may be passed to some small model (e.g., an n-gram model or some other non-neural model) to speculatively generate output, where the small model is trained on the requests such as those described above or similar requests.

Readers will appreciate that as described above (and in other ways), some aspects associated with executing a generative AI system may involve serial processing and execution of various components. Readers will appreciate that while parallel processing is more efficient than serial processing, it is not infinitely more efficient. More specifically and as applied to speculative decoding, while there is a limit to how many speculative guesses (i.e., speculative outputs) that can be sent to the GPUs and downstream components to sift through while still being efficient, that limit is reasonably high for modern computing components such as GPUs. In some embodiments, it may therefore be possible to send batches of guesses (i.e., speculative outputs) in parallel (e.g., guess on the 10 next tokens using model 1 and send that as batch 1, guess on the 10 next tokens using model 2 and send that as batch 2, and so on).

In some embodiments, to reap meaningful benefits from speculative decoding, multiple small models may be used for performing speculative decoding in parallel. More specifically, different types of small models may be used for speculative decoding in parallel, as there is value in making diverse guesses (i.e., speculative outputs) rather than making the same guesses multiple times. For example, because an n-gram model trained as described above may generate dramatically different guesses than an n-gram model trained differently, which may generate dramatically different guesses than a small neural model, the embodiments described herein may leverage multiple types of small models doing speculative decoding in parallel. The observation here may be that while each of these small models has some defects, they have different defects.

In some embodiments, the generative AI systems may leverage a user interface that can itself present useful features of the generative AI system or otherwise provide access to useful features of the generative AI system. For example, in some embodiments a UI may be provided to enable a user of the generative AI system to effectively provide pseudocode that relates to some code that the user would like to have the generative AI system create. In this embodiment, a user of the generative AI system can provide a description of what they want the code to generally do. The user may subsequently be presented with a list of options and the user can make a selection (at which point the model is told to turn the selection into real code). Furthermore, in some embodiments other features could be delivered through the UI. For example, the UI may present information to a user of the generative AI system to show the user what sources from their code base were used to do some code completion/code creation that was output by the generative AI system. In some embodiments, the user could even provide feedback (e.g., indicate whether the source is good source or not) that one or more models in the generative AI system can be trained on.

In some embodiments, an auditing function could be delivered through the UI, where a user of the generative AI system could be presented with information identifying what portions of some code was written by a developer (or edited by a developer) and what part was generated by the generative AI system. In some embodiments, information could even be delivered through the generative AI system indicating which user within their organization wrote some code, what the code generation tool wrote, and discovered issues or other metrics could even be tied back to those specific code portions. For example, tools could be used to tie the introduction of some code update to performance degradation that was discovered, to the introduction of a security vulnerability that was discovered, to a spike in memory utilization that was discovered, and so on. Not only would it be useful to alert a user to this sort of information via the UI, but this information could even be used as a signal that is mapped back to a particular change for training, remediation, and so on.

Readers will appreciate that in some situations users of a generative AI system that generates computer program code may experience problems when autosuggesting or completing code. For example, users may be working on incomplete state of their code where a large amount of code (e.g., a function or class) may need to be completed, but they would prefer to review and accept completions in small amounts (e.g., a single function call, statement, or for loop). In addition, users may have some structure (e.g., closing brackets, quotes) that is auto-inserted by their IDE, which need to be skipped by code generation models during code generation. In some embodiments, pause and skip tokens may be utilized to address the situations described above.

To address the situation where a user would prefer to review and accept completions in small amounts, the code generation models that are included in the generative AI systems described here may be trained to generate a special "pause" token that helps the IDE to show the user a smaller completion. In these embodiments, if the user approves this completion, it can immediately show the next part of the completion and so on. This may be achieved, for example and in some embodiments, by modifying the training algorithms that are used to insert pause tokens at the boundaries between syntactic units (i.e., with the help of a parse tree). The code generation models may then be taught to still generate everything that's missing after the cursor, but doing so in multiple pauses so that we can stop the generation after any pause token and present the user with more manageably-sized suggestions that are syntactically correct.

To address the situation where users may have some structure (e.g., closing brackets, quotes) that is auto-inserted by their IDE and needs to be skipped by code generation models during code generation, the code generation models that are included in the generative AI system may be trained to generate a special "skip" token that indicates to the IDE that a completion can skip over some of the text after the cursor. In some embodiments, such auto-closing behaviors may be simulated during training data generation (again, making use of a parse tree) and the code generation models may be taught to output a skip token whenever it needs to "jump over" the next closing bracket or other skippable characters.

Although some embodiments are described largely in the context of a generative AI system, a server with generative AI capabilities, or in some other way, readers of skill in the art will recognize that embodiments of the present disclosure may also take the form of a computer program product disposed upon computer readable storage media for use with any suitable processing system. Such computer readable storage media may be any storage medium for machine-readable information, including magnetic media, optical media, solid-state media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps described herein as embodied in a computer program product. Persons skilled in the art will recognize also that, although some of the embodiments described in this specification are oriented to software installed and executing on computer hardware, nevertheless, alternative embodiments implemented as firmware or as hardware are well within the scope of the present disclosure.

Readers will appreciate that some embodiments are described in which computer program instructions are executed on computer hardware such as, for example, one or more computer processors. Readers will appreciate that in other embodiments, computer program instructions may be executed on virtualized computer hardware (e.g., one or more virtual machines), in one or more containers, in one or more cloud computing instances (e.g., one or more AWS EC2 instances), in one or more serverless compute instances offered such as those offered by a cloud services provider, in one or more event-driven compute services such as those offered by a cloud services provider, or in some other execution environment.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A method of presenting domain-specific code suggestions for computer program code, the method comprising:

receiving a request to generate computer program code that is associated with a domain-specific code base;

presenting a user interface comprising a first window displaying a target computer program code;

generating a code suggestion based on the domain-specific code base and the target computer program code;

presenting the code suggestion via a second window of the user interface, the code suggestion comprising a section of computer code;

executing the section of computer code of the code suggestion presented in the second window separately from the target computer program code and prior to incorporating the code suggestion in the target computer program code; and in response to determining that the execution of the section of computer code is satisfactory, incorporating the section of computer code into the target computer program code in the first window.

2. The method of claim 1, wherein presenting the code suggestion further comprises:

presenting one or more references to portions of the domain-specific code base that were used to generate the code suggestion.

3. The method of claim 1, further comprising:

presenting a plurality of code suggestions including the code suggestion in the second window of the user interface based on the request;

receiving an acceptance of the code suggestion; and replicating the code suggestion from the second window to the first window.

4. The method of claim 1, wherein incorporating the code suggestion into the computer program code further comprises:

identifying, based on the computer program code and the code suggestion, a placement for the code suggestion within the target computer program code; and incorporating the code suggestion based on the identified placement.

5. The method of claim 1, wherein the request comprises a code modification request, the method further comprising:

presenting the code suggestion in the second window of the user interface in response to a request to modify a code portion of the target computer program code, wherein the code suggestion represents a modification to the code portion.

6. The method of claim 5, further comprising:

presenting, via the user interface, the code portion of the target computer program and the code suggestion representing the modification to the code portion, wherein the code suggestion is presented in the second window of the user interface and the code portion is presented in the first window of the user interface simultaneously.

7. The method of claim 1, further comprising:

receiving a chat message associated with the target computer program code; and presenting a chat message response that was generated using the domain-specific code base, wherein the chat message response includes one or more of portions of the domain-specific code base or explanatory output generated based on the domain-specific code base.

8. The method of claim 1, further comprising:

receiving a pseudocode instruction via the user interface; and presenting, in response to receiving the pseudocode instruction, the code suggestion that was generated using the domain-specific code base.

9. The method of claim 1, further comprising:

receiving a code execution request associated with the code suggestion; and presenting, via the user interface, one or more code execution results including presenting a first result of a first execution of a portion of code of the target computer program code presented in the first window of the user interface or a second result of a second execution of the code suggestion.

10. A non-transitory computer-readable storage medium, having instructions stored thereon that, when executed by a processor, cause the processor to:

receive a request related to computer program code that is associate with a domain-specific code base;

present a user interface comprising a first window displaying a target computer program code;

generate a code suggestion based on the domain-specific code base and the target computer program code;

present the code suggestion via a second window of the user interface, the code suggestion comprising a section of computer code;

execute the section of computer code of the code suggestion presented in the second window separately from the target program code and prior to incorporating the code suggestion in the target computer program code; and in response to determining that the execution of the section of computer code is satisfactory, incorporate the section of computer code into the target computer program code in the first window.

11. The non-transitory computer-readable storage medium of claim 10, wherein the instructions, when executed, further cause the processor to:

present a plurality of code suggestions including the code suggestion in the second window of the user interface based on the request;

receive an acceptance of the code suggestion; and replicate the code suggestion from the second window to the first window.

12. The non-transitory computer-readable storage medium of claim 11, wherein to incorporate the code suggestion into the computer program code, the instructions, when executed, further cause the processor to:

identify, based on the computer program code and the code suggestion, a placement for the code suggestion within the target computer program code; and incorporating the code suggestion based on the identified placement.

13. The non-transitory computer-readable storage medium of claim 10, wherein the request comprises a code modification request, and wherein the instructions, when executed, further cause the processor to:

present the code suggestion via the user interface in response to a request to modify a code portion, wherein the code suggestion represents a modification to the code portion.

14. A system comprising:

a memory; and a processing device, operatively coupled to the memory, the processing device configured to:

receive, via a user interface, a request related to computer program code that is associated with a domain-specific code base;

present a user interface comprising a first window displaying a target computer program code;

generate a code suggestion based on the domain-specific code base and the target computer program code;

present the code suggestion via a second window of the user interface, the code suggestion comprising a section of computer code;

execute the section of computer code of the code suggestion presented in the second window separately from the target program code and prior to incorporating the code suggestion in the target computer program code; and in response to determining that the execution of the section of computer code is satisfactory, incorporate the section of computer code into the target computer program code in the first window.

15. The system of claim 14, wherein the processing device is further configured to:

present a plurality of code suggestions including the code suggestion in a second window of the user interface based on the request;

receive an acceptance of the code suggestion; and replicate the code suggestion from the second window to the first window.

16. The system of claim 14 wherein the processing device is further configured to:

identify, based on the computer program code and the code suggestion, a placement for the code suggestion within the target computer program code; and incorporate the code suggestion based on the identified placement.

17. A method of presenting domain-specific code suggestions, the method comprising:

generating a domain-specific code suggestion using a code generation model that can access information describing a domain-specific code base, wherein a user interface is configured to present a first window including target computer program code;

causing the user interface to present the code suggestion via a second window, the code suggestion comprising a section of computer code;

execute the section of computer code of the code suggestion presented in the second window separately from the target program code and prior to incorporating the code suggestion in the target computer program code; and in response to determining that the execution of the section of computer code is satisfactory, incorporate the section of computer code into the target computer program code in the first window.

18. The method of claim 17, wherein causing the user interface to present the code suggestion further comprises:

determining that a first code portion exists within the domain-specific code base that is similar to target computer program code that is being presented via the first window of the user interface; and causing the user interface to present one or more of the first code portion or a reference to the first code portion in the second window.

19. The method of claim 17, wherein causing the user interface to present the code suggestion further comprises:

identifying code portions from the domain-specific code base that were used by the code generation model to generate the code suggestion; and causing the user interface to present one or more of the identified code portions or a reference to the identified code portions in the second window.

20. The method of claim 17, further comprising:

receiving user inputs relative to the presented code suggestion; and updating an implementation of the code generation model using the received user inputs.

* * * * *